US012478606B2

(12) United States Patent
Loutit et al.

(10) Patent No.: US 12,478,606 B2
(45) Date of Patent: Nov. 25, 2025

(54) METHODS OF TREATING BACTERIAL INFECTIONS

(71) Applicant: MELINTA SUBSIDIARY CORP., Parsippany, NJ (US)

(72) Inventors: Jeffrey S. Loutit, Lincolnshire, IL (US); Michael N. Dudley, Lincolnshire, IL (US); Elizabeth E. Morgan, Lincolnshire, IL (US); Karen Fusaro, Lincolnshire, IL (US); David C. Griffith, Lincolnshire, IL (US); Olga Lomovskaya, Lincolnshire, IL (US)

(73) Assignee: MELINTA SUBSIDIARY CORP., Parsippany, NJ (US)

( * ) Notice: Subject to any disclaimer, the term of this patent is extended or adjusted under 35 U.S.C. 154(b) by 0 days.

(21) Appl. No.: 16/474,487

(22) PCT Filed: Jan. 8, 2018

(86) PCT No.: PCT/US2018/012839
§ 371 (c)(1),
(2) Date: Jun. 27, 2019

(87) PCT Pub. No.: WO2018/129479
PCT Pub. Date: Jul. 12, 2018

(65) Prior Publication Data
US 2019/0336475 A1 Nov. 7, 2019

Related U.S. Application Data

(60) Provisional application No. 62/513,936, filed on Jun. 1, 2017, provisional application No. 62/444,238, filed on Jan. 9, 2017.

(51) Int. Cl.
*A61K 31/381* (2006.01)
*A61K 9/00* (2006.01)
(Continued)

(52) U.S. Cl.
CPC .......... *A61K 31/381* (2013.01); *A61K 9/0019* (2013.01); *A61K 31/407* (2013.01); *A61P 31/04* (2018.01)

(58) Field of Classification Search
CPC .............. A61K 2300/00; A61K 31/381; A61K 31/407; A61K 31/69; A61K 9/0019;
(Continued)

(56) References Cited

U.S. PATENT DOCUMENTS

| 8,680,136 B2 | 3/2014 | Hirst et al. |
| 2012/0040932 A1 | 2/2012 | Hirst et al. |

(Continued)

FOREIGN PATENT DOCUMENTS

| JP | 2018-513188 A | 5/2018 |
| WO | WO-87/05297 A1 | 9/1987 |

(Continued)

OTHER PUBLICATIONS

Clinical Trial NCT02168946 (Oct. 6, 2104).*

(Continued)

*Primary Examiner* — Jeffrey S Lundgren
*Assistant Examiner* — Anthony Joseph Seitz
(74) *Attorney, Agent, or Firm* — Wilmer Cutler Pickering Hale and Dorr LLP

(57) ABSTRACT

Methods of treating or ameliorating urinary tract infection (UTI), including complicated urinary tract infection (cUTI) and acute pyelonephritis (AP), comprising administering a composition comprising a cyclic boronic acid ester vaborbactam in combination with meropenem are disclosed herewith.

69 Claims, 2 Drawing Sheets

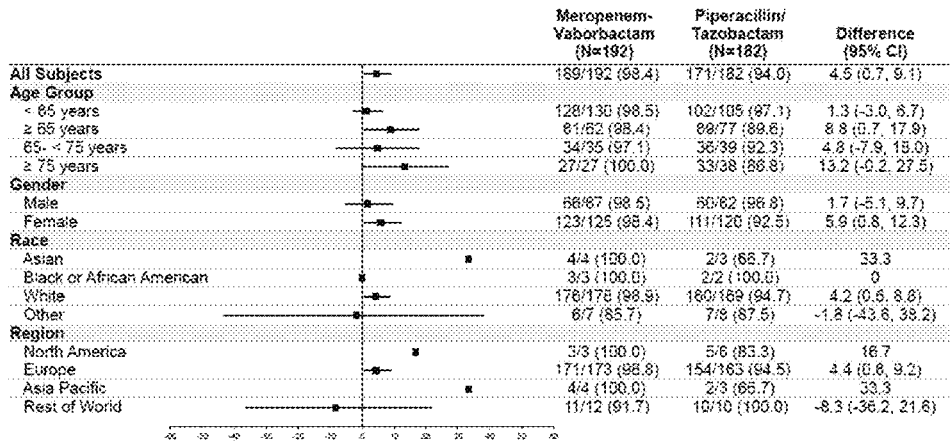

(51) Int. Cl.
A61K 31/407 (2006.01)
A61P 31/04 (2006.01)

(58) Field of Classification Search
CPC .......... A61K 45/06; A61P 13/02; A61P 13/12; A61P 31/04; Y02A 50/30
See application file for complete search history.

(56) References Cited

U.S. PATENT DOCUMENTS

| | | | |
|---|---|---|---|
| 2013/0331355 A1 | 12/2013 | Griffith et al. | |
| 2016/0339045 A1* | 11/2016 | Griffith | ............... A61K 31/407 |
| 2017/0065626 A1 | 3/2017 | Bonomo et al. | |

FOREIGN PATENT DOCUMENTS

| | | |
|---|---|---|
| WO | WO-10/41112 A1 | 4/2010 |
| WO | WO-12/21455 A1 | 2/2012 |
| WO | WO-2013/184845 A1 | 12/2013 |
| WO | WO-2016/172208 A1 | 10/2016 |
| WO | WO-2018/129479 A1 | 7/2018 |

OTHER PUBLICATIONS

Jaspers (Meropenem versus Cefuroxime plus Gentamicin for Treatment of Serious Infections in Elderly Patients, Antimicrobial Agents and Chemotherapy, May 1998, p. 1233-1238).*
Camins (The Clinical Impact of Fluoroquinolone Resistance in Patients with E. coli Bacteremia, J Hosp Med. Jul. 2011 ; 6(6): 344-349).*
As SIRS: Are sepsis and sirs the same thing?. ApolloMD. (Mar. 15, 2024). https://apollomd.com/glossary/sepsis-sirs-thin/#:~:text=SIRS%2C%20or%20systemic%20inflammatory%20response,other%20process%20causing%20SIRS%20criteria. (Year: 2024).*
Weiss et al., Abstract B-078, Poster Presentation—55th ICAAC, 58th ICC, Sep. 2015 (Year: 2015).*
Hauck et al., Clinical Microbiology and Infection, vol. 22, Issue 6, 2016, pp. 513-519 (Year: 2016).*
James R. Johnson, Definition of Complicated Urinary Tract Infection, Clinical Infectious Diseases, vol. 64, Issue 4, Feb. 15, 2017, p. 529 (Year: 2017).*
As SIRS: Are sepsis and sirs the same thing?. ApolloMD. (2024, Mar. 15). https://apollomd.com/glossary/sepsis-sirs-thin/#:~:text=SIRS%2C%20or%20systemic%20inflammatory%20response,other%20process%20causing%20SIRS%20criteria. (Year: 2024).*
Jaspers et al., 1998. Antimicrob Agents Chemother 42: No. 5 (Year: 1998).*
Charlson ME, Pompei P, Ales KL, Mackenzie CR. A new method of classifying prognostic comorbidity in longitudinal studies: development and validation. J Chronic Dis. 1987;40(5):373-83, Abstract (Year: 1987).*
Drekonja DM, Rector TS, Cutting A, Johnson JR. Urinary Tract Infection in Male Veterans: Treatment Patterns and Outcomes. JAMA Intern Med. 2013;173(1):62-68 (Year: 2013).*
International Search Report and Written Opinion mailed Apr. 18, 2018 by Australian Patent Office as International Searching Authority for International Patent Application No. PCT/US2018/012839 filed on Jan. 8, 2018 (16 total pages).
International Preliminary Report on Patentability mailed Jul. 18, 2019 by International Bureau of WIPO for International Patent Application No. PCT/US2018/012839 filed on Jan. 8, 2018 (10 total pages).
No Author, "Efficacy, Safety, Tolerability of Carbavance Compared to Piperacillin/Tazobactam in Complicated Urinary Tract Infections (cUTIs), Including Acute Pyelonephritis (AP) in Adults," ClinicalTrials.gov Archive—trial NCT02166476 (Dec. 1, 2016) last retrieved on Apr. 24, 2018 from URL: https://clinicaltrials.gov/ct2/history/NCT02166476?A=22&B=22&C=merged (20 total pages).
Weiss, W.J., et al., "Efficacy of Carbavance (Meropenem+RPX7009) against Carbapenem-resistant E.coli and K.pneumoniae in a Murine UTI Model," Abstract B-078, Poster presentation—55th ICAAC, 58th ICC, (Sep. 17-21, 2015) last retrieved on Apr. 9, 2018 from URL: https://www.unthsc.edu/research/wp-content/uploads/sites/21/ICAAC-2015-Rempex-Poster-B-078.pdf. (1 total pages).
Weiss, W.J., et al., "Efficacy of Carbavance (Meropenem-RPX7009) against Carbapenem-resistant E.coli in a Murine UTI Infection Model," Abstracts of the Interscience Conference on Antimicrobial Agents and Chemotherapy, vol. 55, pp. 121-122, Presentation Abstract (2015) (4 total pages).
No Author, "Dose-finding, Pharmacokinetics, Safety, and Tolerability of Meropenem-Vaborbactam in Pediatric Subjects With Serious Bacterial Infections," ClinicalTrials.gov Archive—trial NCT02687906, (Dec. 1, 2016) last retrieved on Apr. 25, 2018 from URL: https://clinicaltrials.gov/ct2/history/NCT02687906? A=5&B=5&C=merged > (11 total pages).
No Author, "A Study of Meropenem-Vaborbactam Versus Piperacillin/Tazobactam in Participants with Hospital-Acquired and Ventilator-Associated Bacterial Pneumonia (TANGOIII)," ClinicalTrials.gov—trial NCT03006679 (Dec. 30, 2016) last retrieved on Apr. 25, 2018 from URL: https://clinicaltrials.gov/ct2/show/NCT03006679?term=vaborbactam+AND+meropenem&rank=2 (11 total pages).
Weiss, W.J., et al., "Activity of Meropenem-Vaborbactam against Carbapenem-Resistant Enterobacteriaceae in a Murine Model of Pyelonephritis," Antimicrobial Agents and Chemotherapy, vol. 62, Issue 1, e01439-17, pp. 1-5 (Jan. 2018) (5 total pages).
McCarthy, M.W. and Walsh, T.J., "Meropenem/vaborbactam fixed combination for the treatment of patients with complicated urinary tract infections," Drugs of Today, vol. 53(10), pp. 521-530 (Oct. 2017) (10 total pages).
Kaye, K.S., et al., "Effect of Meropenem-Vaborbactam vs Piperacillin-Tazobactam on Clinical Cure or Improvement and Microbial Eradication in Complicated Urinary Tract Infection," JAMA, vol. 319, pp. 788-799 (Feb. 27, 2018) (20 total pages).
Charlson, M., et al., "The Charlson Comorbidity Index Can be Used Prospectively to Identify Patients Who Will Incur High Future Costs," PLoS ONE, vol. 9, No. 12, e112479, pp. 1-16 (Dec. 3, 2014).
Merck Sharp & Dohme Corp., "Critical Care Scoring Systems—Critical Care Medicine—Merck Manuals Professional Edition", (3 total pages) last retrieved on Dec. 21, 2020 from https://www.merckmanuals.com/professional/critical-care-medicine/approach-to-the-critically-ill-patient/critical-care-scoring-systems.
No Author, "A Phase 3, Multi-center, Randomized, Open-Label Study of Carbavance (Meropenem/RPX7009) versus Best Available Therapy in Subjects with Selected Serious Infections due to Carbapenem-Resistant Enterobacteriaceae," sponsored by Rempex Pharmaceuticals, Inc., 116 total pages (Apr. 24, 2015 version), last retrieved on Jun. 29, 2021 from: https://clinicaltrials.gov/ProvidedDocs/46/NCT02168946/Prot_000.pdf.
J. Loutit et al., "LB-7. Meropenem-Vaborbactam (M-V) Compared with Piperacillin-Tazobactam (P-T) in the Treatment of Adults with Complicated Urinary Tract Infections (CUTI), including Acute Pyelonephritis (AP) in a Phase 3 Randomized, Double-blind, Double-dummy Trial (Tango 1)," presented at ID Week 2016, New Orleans LA (Oct. 26-30, 2016), LB-7 Oral Abstract Session: Saturday, Oct. 29, 2016 (downloaded from <https://idsa.confex.com/idsa/2016/webprogram/Paper60823.html>, last retrieved on Jan. 18, 2022 (three total pages)).
Y. Oshida, et al., "The Characteristics of Urinary Tract Infection with Urosepsis," The Journal of the Japanese Association for Infectious Diseases, vol. 88, No. 5, pp. 678-684 includes English abstract (2014).
Notice of Reasons for Rejection mailed Nov. 2, 2021 by Japanese Patent Office for Japanese Patent Application No. 2019-537269 with English translation (10 total pages).
Office Action mailed by Chilean Patent Office in Chilean Patent Application No. 202001886 on Feb. 14, 2022 with English translation (17 total pages).
No Author Listed, Diagnosis, treatment and nursing for respiratory disease, Publishing House of Jinan, Aug. 2005, 1st edition, pp. 140-141 (Aug. 31, 2005) with English translation (5 total pages).

(56) References Cited

OTHER PUBLICATIONS

No Author Listed, "Pharmacology for Respiratory and Digestive Disease," Tianjin Science and Technology Press, Sep. 2011, 1st edition, pp. 318-319 with English translation (5 total pages).

Office Action mailed May 7, 2022 by Chinese Patent Office in Chinese Patent Application No. 201880006135.5 with English translation (14 total pages).

Sato, Y., et al., "Clinical Trial Planning: Study Design and Data Analysis," The Japanese Journal of Pediatric Allergy and Clinical Immunology, vol. 29, No. 2, pp. 214-221 (2015) with partial English translation (10 total pages).

Tateishi, Tomonori, "Clinical Trials in Volunteers with Renal or Hepatic Impairment: Objective and Study Design," Japanese Journal of Clinical Pharmacology, vol. 35, No. 5, pp. 265-268 (2004) with partial English translation (6 total pages).

Yamamoto, Haruko, "Desgin of late-phase clinical trials: something you should know," Japanese Journal of Thrombosis and Hemostasis, vol. 26, No. 4, pp. 396-401 (2015) with partial English translation (7 total pages).

Decision of Rejection mailed Jul. 5, 2022 by Japanese Patent Office in Japanese Patent Application No. 2019-537269 with English translation (6 total pages).

Notification of Requisition mailed Jul. 15, 2022 by Canadian Intellectual Property Office in Canadian Patent Application No. 2982911 (3 total pages).

Office Action mailed Jul. 20, 2022 by Brazilian National Institute of Industrial Property in Brazilian Patent Application No. BR112019014089-1 with English translation (6 total pages).

Communication pursuant to Article 94(3) EPC mailed Jul. 20, 2022 by European Patent Office in European Patent Application No. 18735813.0 (4 total pages).

Office Action mailed Jul. 29, 2022 by Indonesian Intellectual Property Office in Indonesian Patent Application No. PID201906867 with English translation (6 total pages).

Examination Report mailed Aug. 22, 2022 by New Zealand Intellectual Property Office in New Zealand Patent Application No. 755141 (5 total pages).

Notice of Allowance issued May 29, 2024 by Korean Patent Office in Korean Patent Application No. 10-2019-7023321 with English translation (7 total pages).

Office Action issued Jul. 5, 2024 by Brazilian Patent Office in Brazilian Patent Application No. BR112019014089-1 with English translation (8 total pages).

Notice of Reasons for Rejection issued Dec. 4, 2023 by Japanese Patent Office in Japanese Patent Application No. 2022-178016 with English translation (2 total pages).

Appeal Decision to Patent issued Jan. 11, 2024 by Japanese Patent Office in Japanese Patent Application No. 2019-537269 with English translation (6 total pages).

Office Action issued Mar. 10, 2023 by Mexican Patent Office in Mexican Patent Application No. MX/a/2022/001704 with English translation (7 total pages).

Office Action issued Jan. 4, 2023 by Chinese Patent Office in Chinese Patent Application No. 201880006135.5 with English translation (10 total pages).

Rejection Ruling issued Jan. 5, 2023 by Chilean Patent Office in Chilean Patent Application No. 2019-001918 with English translation (6 total pages).

Examination Report issued Feb. 1, 2023 by Australian Patent Office in Australian Patent Application No. 2018205327 (6 total pages).

Communication pursuant to Article 94(3) EPC issued May 6, 2024 by European Patent Office in European Patent Application No. 23159896.2 (4 total pages).

Substantive Examination—Adverse Report (Section 30(1)) issued Jan. 26, 2024 by Intellectual Property Corporation of Malaysia in Malaysian Patent Application No. PI2019003938 (4 total pages).

Office Action issued Mar. 12, 2024 by Canadian Intellectual Property Office in Canadian Patent Application No. 3,048,650 (4 total pages).

Griffith, D.C., et al., "Phase 1 Study of the Safety, Tolerability, and Pharmacokinetics of the ß-Lactamase Inhibitor Vaborbactam (RPX7009) in Healthy Adult Subjects," Antimicrobial Agents and Chemotherapy, vol. 60, No. 10, pp. 6326-6332 (Oct. 2016).

Extended European Search Report issued May 22, 2023 by European Patent Office in European Patent Application No. 23159896.2 (10 total pages).

Notice of Preliminary Rejection issued Jul. 17, 2023 by Korean Intellectual Property Office in Korean Patent Application No. 10-2019-7023321 with English translation (11 total pages).

Substantive Examination Report issued Jul. 18, 2023 by Filipino Patent Office in Filipino Patent Application No. 1/2019/501606 (4 total pages).

Ackley, R., et al., "Meropenem-Vaborbactam versus Ceftazidime-Avibactam for Treatment of Carbapenem-Resistant Enterobacteriaceae Infections," Antimicrobial Agents and Chemotherapy, vol. 64, Issue 5, e02313-19, pp. 1-10 (May 2020).

Alexander, E.L., et al., "Carbapenem-Resistant Enterobacteriaceae Infections: Results From a Retrospective Series and Implications for the Design of Prospective Clinical Trials," Open Forum Infectious Diseases ("OFID"), pp. 1-10, DOI: 10.1093/ofid/ofx063 (accepted Apr. 10, 2017).

Askim, A., et al., "Epidemiology and outcome of sepsis in adult patients with *Streptococcus pneumoniae* infection in a Norwegian county 1993-2011: an observational study," BMC Infectious Diseases, vol. 16, No. 223, pp. 1-9, DOI 10.1186/s12879-016-1553-8 (Year: 2016).

Balk, R., A., "Systemic inflammatory response syndrome (SIRS) Where did it come from and is it still relevant today?," Virulence, vol. 5, Issue 1, pp. 20-26 (Jan. 1, 2014).

Becerra, M.B., et al., "Impact of Clostridium difficile infection among pneumonia and urinary tract infection hospitalizations: an analysis of the Nationwide Inpatient Sample," BMC Infectious Diseases, vol. 15, No. 254, pp. 1-9, DOI 10.1186/s12879-015-0925-9 (Year: 2015).

Capone, A., "High rate of colistin resistance among patients with carbapenem-resistant Klebsiella pneumoniae infection accounts for an excess of mortality," Clin. Microbiol. Infect., vol. 19, pp. E23-E30 (Article published onilne Oct. 18, 2012).

Chopra, T., et al., "Risk Factors and Outcomes for Patients with Bloodstream Infection Due to Acinetobacter baumannii-calcoaceticus Complex," Antimicrobial Agents and Chemotherapy, vol. 58., No. 8, pp. 4630-4635 (Aug. 2014).

"De Jager, P., et al., "Nosocomial Outbreak of New Delhi Metallo-β-Lactamase-1-Producing Gram-Negative Bacteria in South Africa: A Case-Control Study, "PLoS ONE, vol. 10, No. 4, e0123337, doi:10.1371/journal.pone.0123337, pp. 1-12 (Published Apr. 24, 2015)".

D'Hoore, W., et al., "Practical considerations on the use of the charlson comorbidity index with administrative data bases," Journal of Clinical Epidemiology, vol. 49, Issue 12, p. P1429-P1433 (Dec. 1996 )—Abstract Only (8 total pages) last retrieved on Jun. 9, 2025 from https://www.jclinepi.com/article/S0895-4356(96)00271-5/abstract.

Drewry, A.M. and Hotchkiss, R.S.., "Revising definitions of sepsis," Nat. Rev. Nephrol., vol. 11, No. 6, pp. 326-328, doi:10.1038/nrneph.2015.66 (Jun. 2015)—Author Manuscript available in PMC Dec. 9, 2015 (5 total pages).

Emerson, C.B., et al., "Healthcare-Associated Infection and Hospital Readmission," Infect. Control. Hosp. Epidemiol., vol. 33, No. 6, pp. 539-544, doi:10.1086/665725 (Jun. 2012)—Author Manuscript available in PMC Jun. 10, 2013 (10 total pages).

Johnson, S.W., et al., "Utility of a Clinical Risk Factor Scoring Model in Predicting Infection with Extended-Spectrum β-Lactamase-Producing Enterobacteriaceae on Hospital Admission," Infect. Control. Hosp. Epidemiol., vol. 34, No. 4, pp. 385-392, doi:10.1086/669858 (Apr. 2013)—Author Manuscript available in PMC Apr. 1, 2014 (13 total pages).

Kaukonen, K.-M., et al., "Systemic Inflammatory Response Syndrome Criteria in Defining Severe Sepsis," The New England Journal of Medicine, vol. 372, pp. 1629-1638, DOI: 10.1056/NEJMoa1415236 (Apr. 23, 2015).

(56) References Cited

OTHER PUBLICATIONS

Leistner, R., et al., "Mortality and molecular epidemiology associated with extended-spectrum β-lactamase production in *Escherichia coli* from bloodstream infection," Infection and Drug Resistance, vol. 7, pp. 57-62, http://dx.doi.org/10.2147/IDR.S56984 (Mar. 13, 2014).
Liao, M.M., et al., "Sensitivity of Systemic Inflammatory Response Syndrome for Critical Illness Among Emergency Department Patients," Am. J. Emerg. Med., vol. 32, No. 11, pp. 1319-1325, doi:10.1016/j.ajem.2014.07.035 (Nov. 2014)—Author Manuscript available in PMC Nov. 1, 2015 (16 total pages).
No Author, "A Study of Meropenem-Vaborbactam Versus Piperacillin/Tazobactam in . . . ," ClinicalTrials.gov ID NCT03006679, Sponsor: Melinta Therapeutics, Inc., Last Update Posted Jan. 11, 2019—Version Dec. 27, 2016, last retrieved Nov. 26, 2024 from URL: https://clinicaltrials.gov/study/NCT03006679?term=NCT03006679&rank=1&tab=history&a=1#version-content-panel (15 total pages).
No Author, "Dose-finding, Pharmacokinetics, and Safety of Vabomere in Pediatric Subjects With Bacterial Infections (Tangokids)," ClinicalTrials.gov ID NCT02687906, Sponsor: Rempex (a wholly owned subsidiary of Melinta Therapeutics, LLC), Last Update Posted Oct. 1, 2024—Version Dec. 1, 2016, last retrieved Nov. 26, 2024 from https://clinicaltrials.gov/sludy/NCT02687906?1erm = NCT02687906&rank=1 &lab=history&a=5#version-content-panel (15 total pages).
No Author, "Efficacy, Safety, Tolerability of Carbavance Compared to Best Available Therapy in Serious Infections Due to Carbapenem Resistant Enterobacteriaceae, in Adults," ClinicalTrials.gov Archive—trial NCT02168946, (Oct. 6, 2016) last retrieved on Apr. 25, 2018 from URL: https://clinicaltrials.gov/ct2/history/NCT02168946?A=1&B=18&C=merged (19 total pages).
No Author, "Efficacy/Safety of Meropenem-Vaborbactam Compared to Piperacillin-Tazobactam in Adults with cUTI and AP," ClinicalTrials.gov ID NCT02166476, Sponsor: Melinta Therapeutics, Inc., Last Update Posted Jun. 11, 2018—Version 22: Dec. 1, 2016 (13 total pages).
No Author, "Efficacy, Safety, Tolerability of Vabomere Compared to Best Available Therapy in Treating Serious Infections in Adults," ClinicalTrials.gov ID NCT02168946, Sponsor: Rempex (a wholly owned subsidiary of Melinta Therapeutics, LLC), Last Update Posted Mar. 4, 2019—Version Oct. 6, 2016, last retrieved Nov. 26, 2024 from URL: https:/ /clinicaltrials. gov/study/NCT02168946?term=NCT02168946&rank=1&tab=history&a=18#version-content-panel (21 total pages).
No Author, "Summary of Product Characteristics," for "Vaborem 1 g/1 g powder for concentrate for solution for infusion meropenem/vaborbactam," issued by European Medicines Agency—"Marketing Authorisation Number[ ]": EU/1/18/1334/001; "Marketing Authorisation Holder": Menarini International Operations Luxembourg S.A.; "Date of First Authorisation/Renewal of the Authorisation": Nov. 20, 2018 (33 total pages).
Seymour, C.W., "Assessment of Clinical Criteria for Sepsis for the Third International Consensus Definitions for Sepsis and Septic Shock (Sepsis-3)," JAMA, vol. 315, No. 8, pp. 762-774 (Feb. 23, 2016).
Singer, M., et al., "The Third International Consensus Definitions for Sepsis and Septic Shock (Sepsis-3)," JAMA, vol. 315, No. 8, pp. 801-810 (Feb. 23, 2016).
Tumbarello, M., et al., "Outcomes and Predictors of Mortality in Patients With KPC-Kp Infections Treated With Meropenem Vaborbactam: An Observational Multicenter Study," Open Forum Infectious Diseases, pp. 1-10, https://doi.org/10.1093/ofid/ofae273 (published online May 8, 2024).
Tuon, F.F., "KPC-producing Enterobacter aerogenes infection," The Brazilian Journal of Infectious Diseases, vol. 19, No. 3, pp. 324-327 (Available online Feb. 23, 2015).
Tusgul, S., et al., "Low sensitivity of qSOFA, SIRS criteria and sepsis definition to identify infected patients at risk of complication in the prehospital setting and at the emergency department triage," Scandinavian Journal of Trauma, Resuscitation and Emergency Medicine, vol. 25, No. 108, pp. 1-7, DOI 10.1186/s13049-017-0449-y (Year: 2017).
Wunderink, R.G., et al., "Effect and Safety of Meropenem-Vaborbactam versus Best-Available Therapy in Patients with Carbapenem-Resistant Enterobacteriaceae Infections: The Tango II Randomized Clinical Trial," Infect. Dis. Ther., vol. 7, pp. 439-455, https://doi.org/10.1007/s40121-018-0214-1 (Published online Oct. 1, 2018).
Examination Report issued Dec. 13, 2024 by New Zealand Intellectual Property Office in New Zealand Patent Application No. 795891 (5 total pages).
Communication of a Notice of Opposition issued Jan. 3, 2025 by European Patent Office in European Patent Application No. 18735813.0 (18 total pages).
Substantive Examination Report issued Jan. 7, 2025 by Intellectual Property Office of the Philippines in Filipino Patent Application No. 1/2019/501606 (5 total pages).
Notice of Reasons for Rejection dispatched Sep. 2, 2024 by Japanese Patent Office in Japanese Patent Application No. 2022-178016 with English translation (8 total pages).
Notice of Allowance mailed Apr. 3, 2025 by Filipino Patent Office in Filipino Patent Application No. 1/2019/501606 (3 total pages).
Decision of Rejection issued Jun. 2, 2025 by Japanese Patent Office in Japanese Patent Application No. 2022-178016 with English translation (6 total pages).
Summons to attend oral proceedings pursuant to Rule 115(1) EPC with Preliminary Opinion issued Aug. 25, 2025 by Opposition Division of European Patent Office in European Patent Application No. 18735813.0 (Patent No. 3565551), 17 total pages.

* cited by examiner

Table 6A

| | Meropenem-Vaborbactam (N=192) | Piperacillin/Tazobactam (N=182) | Difference (95% CI) |
|---|---|---|---|
| All Subjects | 189/192 (98.4) | 171/182 (94.0) | 4.5 (0.7, 9.1) |
| Age Group | | | |
| < 65 years | 128/130 (98.5) | 102/105 (97.1) | 1.3 (-3.0, 6.7) |
| ≥ 65 years | 61/62 (98.4) | 69/77 (89.6) | 8.8 (0.7, 17.9) |
| 65- <75 years | 34/35 (97.1) | 36/39 (92.3) | 4.8 (-7.9, 18.0) |
| ≥ 75 years | 27/27 (100.0) | 33/38 (86.8) | 13.2 (-0.2, 27.5) |
| Gender | | | |
| Male | 66/67 (98.5) | 60/62 (96.8) | 1.7 (-5.1, 9.7) |
| Female | 123/125 (98.4) | 111/120 (92.5) | 5.9 (0.8, 12.3) |
| Race | | | |
| Asian | 4/4 (100.0) | 2/3 (66.7) | 33.3 |
| Black or African American | 3/3 (100.0) | 2/2 (100.0) | 0 |
| White | 176/178 (98.9) | 160/169 (94.7) | 4.2 (0.6, 8.8) |
| Other | 6/7 (85.7) | 7/8 (87.5) | -1.8 (-43.6, 38.2) |
| Region | | | |
| North America | 3/3 (100.0) | 5/6 (83.3) | 16.7 |
| Europe | 171/173 (98.8) | 154/163 (94.5) | 4.4 (0.6, 9.2) |
| Asia Pacific | 4/4 (100.0) | 2/3 (66.7) | 33.3 |
| Rest of World | 11/12 (91.7) | 10/10 (100.0) | -8.3 (-36.2, 21.6) |

FIG. 1

Table 6B

| | Meropenem-Vaborbactam (N=192) | Piperacillin/Tazobactam (N=182) | Difference (95% CI) |
|---|---|---|---|
| Creatinine Clearance | | | |
| <30 mL/min | 1/1 (100.0) | 1/1 (100.0) | 0 |
| 30 - 50 mL/min | 20/20 (100.0) | 20/22 (90.9) | 9.1 (-8.1, 28.1) |
| >50 mL/min | 166/169 (98.2) | 147/156 (94.2) | 4 (-0.1, 9.0) |
| Diabetes Status | | | |
| Yes | 32/32 (100.0) | 31/34 (91.2) | 8.8 (-2.5, 23.1) |
| No | 157/160 (98.1) | 140/148 (94.6) | 3.5 (-0.7, 8.7) |
| SIRS Status | | | |
| Yes | 54/55 (98.2) | 58/61 (95.1) | 3.1 (-5.3, 12.0) |
| No | 135/137 (98.5) | 113/121 (93.4) | 5.2 (0.5, 11.2) |
| Charlson Comorbidity Score Category | | | |
| ≤2 | 87/89 (97.8) | 75/77 (97.4) | 0.4 (-5.6, 7.0) |
| ≥3 | 102/103 (99.0) | 96/105 (91.4) | 7.6 (2.2, 14.7) |

FIG. 2

METHODS OF TREATING BACTERIAL INFECTIONS

INCORPORATION BY REFERENCE TO ANY PRIORITY APPLICATIONS

The present application is a National Stage Entry of PCT International Application Number PCT/US2018/012839, filed Jan. 8, 2018, which claims the benefit of priorities to U.S. Provisional Application Nos. 62/444,238, filed Jan. 9, 2017 and 62/513,936, filed Jun. 1, 2017, both of which are incorporated by reference in their entireties.

STATEMENT REGARDING FEDERALLY SPONSORED R&D

This application was made with government support under Contract No. HHSO100201400002C awarded by Department of Health and Human Services. The government may have certain rights in the application.

BACKGROUND

Field

Embodiments of the present application relate to antimicrobial compounds, compositions, their use and preparation as therapeutic agents.

Antibiotics have been effective tools in the treatment of infectious diseases during the last half-century. From the development of antibiotic therapy to the late 1980s there was almost complete control over bacterial infections in developed countries. However, in response to the pressure of antibiotic usage, multiple resistance mechanisms have become widespread and are threatening the clinical utility of anti-bacterial therapy. The increase in antibiotic resistant strains has been particularly common in major hospitals and care centers. The consequences of the increase in resistant strains include higher morbidity and mortality, longer patient hospitalization, and an increase in treatment costs.

Urinary tract infections (UTIs) are a major cause of hospital admissions and are associated with significant morbidity and mortality and a high economic burden. The majority of UTIs are those acquired in the community setting (57.4%); 35.6% are healthcare-associated and 7% are nosocomial. Urinary tract infections can be classified according to the anatomic site of infection, such as cystitis or pyelonephritis, and are further classified into complicated or uncomplicated, irrespective of the site and severity of the infection. Complicated UTIs (cUTIs) occur in subjects with anatomic or functional abnormalities of the urinary tract or in those with significant medical or surgical co-morbidities. The microbiology of cUTIs is characterized by a greater variety of organisms and an increased likelihood of antimicrobial resistance compared with uncomplicated UTIs.

*Escherichia coli* (*E. coli*) is the most common etiologic agent for cUTI, causing approximately 60% to 80% of community-acquired UTIs and approximately 50% of hospital-acquired UTIs. Other frequently identified gram-negative organisms include *Klebsiella* spp., *Proteus* spp., *Enterobacter cloacae*, *Serratia marcescens*, and *Pseudomonas aeruginosa*. Frequently identified gram-positive organisms include *Enterococci*, coagulase-negative *staphylococci*, and *Staphylococcus aureus*. Moreover, less virulent organisms that are not commonly pathogenic in the setting of uncomplicated UTIs can cause severe and invasive disease in the setting of cUTIs.

Beta-lactam antimicrobials are considered to be among the most useful classes of antimicrobial agents for treatment of bacterial infections. In particular, the development of broad-spectrum cephalosporin and carbapenem antimicrobials have represented a key advance in the replacement of other classes of drugs with toxicities and a limited spectra of activity against key pathogens. In the current era of increased resistance to extended spectrum cephalosporins, carbapenem antimicrobial agents are frequently the antibiotics of "last defense" for the most resistant pathogens in serious infections, including those found in cUTIs. The recent dissemination of serine carbapenemases (e.g., *Klebsiella pneumoniae* carbapenemase [KPC]) in Enterobacteriaceae in many hospitals worldwide now poses a considerable threat to carbapenem and other members of the beta-lactam class of antimicrobial agents.

In view of the increasing loss of activity of the beta-lactam antibiotic class against Enterobacteriaceae (the most common pathogens associated with hospital-acquired infections), there is a continued need for improved β-lactamase inhibitors combination therapy.

SUMMARY

Some embodiments of the present disclosure relate to methods of treating urinary tract infection (UTI) or acute pyelonephritis (AP), comprising administering a combination of an amount of vaborbactam or a pharmaceutically acceptable salt thereof and an amount of meropenem to a subject in need thereof:

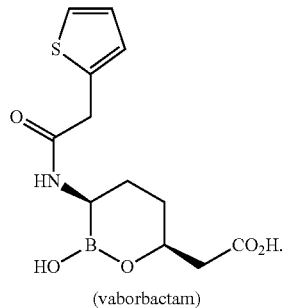 [SMILES: O=C(O)C[C@@H]1CC[C@H](NC(=O)Cc2cccs2)B(O)O1]

(vaborbactam)

In some embodiments, the subject treated by the method described above is a mammal. In some further embodiments, the subject is a human. In some embodiments, the subject is a female. In some embodiments, the subject has a creatinine clearance rate of equal to or greater than 30 mL/min. In some embodiments, the subject has a creatinine clearance rate of equal to or greater than 40 mL/min. In some embodiments, the subject has a systemic inflammatory response syndrome (SIRS). In some other embodiments, the subject has a Charlson comorbidity score equal to or greater than 3.

Some embodiments of the present disclosure relate to methods of treating or ameliorating cUTI or AP in a subject in need thereof, comprising: selecting for treatment a subject having a systemic inflammatory response syndrome (SIRS) who is also suffering from cUTI or AP; and administering a combination of an amount of vaborbactam or a pharmaceutically acceptable salt thereof and an amount of meropenem to the subject. In some embodiments, the subject has one or more of the following characteristics at the time of treatment: body temperature less than 36° C. or more than 38° C., heart rate more than 90 bpm, respiratory rate greater than 20 breaths/min, an arterial partial pressure of carbon dioxide less than 4.3 kPa (32 mmHg), white blood cell count more than 12,000 cells/mm$^3$ or less than 4,000 cells/mm$^3$, or the presence of greater than 10% immature neutrophils. In some embodiments, the subject is a female. In some embodiments, the subject has a creatinine clearance rate of equal to or greater than 30 mL/min. In some embodiments, the subject has a creatinine clearance rate of equal to or greater than 40 mL/min.

Some embodiments of the present disclosure relate to methods of treating or ameliorating cUTI or AP in a subject in need thereof, comprising: selecting for treatment a subject having a Charlson comorbidity score of equal to or greater than 3, who is also suffering from cUTI or AP; and administering a combination of an amount of vaborbactam or a pharmaceutically acceptable salt thereof and an amount of meropenem to the subject. In some embodiments, the subject is a female. In some embodiments, the subject has a creatinine clearance rate of equal to or greater than 30 mL/min. In some embodiments, the subject has a creatinine clearance rate of equal to or greater than 40 mL/min.

In some embodiments of the methods described herein, the subject is suffering from cUTI. In some other embodiments, the subject is suffering from AP. In some embodiments, the subject is also suffering from concomitant bacteremia. In some further embodiments, the administration continues for at least five days.

In some embodiments of the methods described herein, the cUTI or AP is caused by Carbapenem-resistant Enterobacteriaceae (CRE). In some embodiments, the cUTI or AP is caused by a baseline pathogen selected from the group consisting of *E. coli, K. pneumoniae, Enterococcus faecalis, Proteus mirabilis, Enterobacter cloacae* species complex, and *P. aeruginosa*, or combinations thereof.

In some embodiments of the methods described herein, the method provides a higher success rate in the treatment of cUTI or AP as compared to a subject treated with a combination of piperacillin and tazobactam.

Some embodiments of the present disclosure relate to methods of treating or ameliorating a serious infection due to carbapenem-resistant enterobacteriaceae (CRE) in a subject in need thereof, comprising: selecting for treatment a subject having a CRE infection that requires at least 7 days of treatment with intravenous antibiotics; and administering a combination of an amount of vaborbactam or a pharmaceutically acceptable salt thereof and an amount of meropenem to the subject. In some embodiments, the CRE infection is selected from the group consisting of cUTI, AP, cIAI, HABP, VABP, and bacteremia, and combinations thereof. In some such embodiments, the method provides less adverse events in the treatment of the CRE infection as compared to a subject treated with best available therapy. In some further embodiments, the method provides a higher success rate in the treatment of the CRE infection as compared to a subject treated with best available therapy. In some such embodiments, the best available therapy is selected from the group consisting of ciprofloxacin, polymyxin B, colistin, amikacin, meropenem, gentamicin, ertapenem, tigecycline, and ceftazidime-avibactam, and combinations thereof. In some embodiments, the subject is a female. In some embodiments, the subject has a creatinine clearance rate of equal to or greater than 30 mL/min. In some embodiments, the subject has a creatinine clearance rate of equal to or greater than 40 mL/min. In some embodiments, the subject has a systemic inflammatory response syndrome (SIRS). In some other embodiments, the subject has a Charlson comorbidity score equal to or greater than 3, or equal to or greater than 5.

In any embodiments of the methods described herein, the amount of vaborbactam or the pharmaceutically acceptable salt thereof is about 2 g and the amount of meropenem is about 2 g. In some other embodiments, the amount of vaborbactam or the pharmaceutically acceptable salt thereof is about 1 g and the amount of meropenem is about 1 g for treating cUTI or AP in a subject with impaired renal function, for example, in a subject having a creatinine clearance rate of equal to or greater than 20-39 mL/min or 10-19 mL/min. In some further embodiments, the amount of vaborbactam or the pharmaceutically acceptable salt thereof is about 0.5 g and the amount of meropenem is about 0.5 g for treating cUTI or AP in a subject with impaired renal function, for example, in a subject having a creatinine clearance rate of less than 20-39 mL/min. The combination of vaborbactam or pharmaceutically acceptable salt thereof and meropenem may be administered at least once a day, or twice a day (i.e., every 12 hours), or three times a day (i.e., every 8 hours). In one embodiment, the administration is by intravenous infusion. In some such embodiment, the infusion is completed in about 3 hours. In some embodiments, vaborbactam or pharmaceutically acceptable salt thereof is administered prior or subsequent to meropenem. In some other embodiments, vaborbactam or pharmaceutically acceptable salt thereof and meropenem are in a single dosage form.

In any embodiments of the methods described herein, the method further comprises administering one or more additional medicaments selected from the group consisting of an antibacterial agent, antifungal agent, an antiviral agent, an anti-inflammatory agent, and an anti-allergic agent, and combinations thereof.

BRIEF DESCRIPTION OF THE DRAWINGS

FIG. 1 shows a Forest Plot of overall success rate at End Of IV-Treatment (EOIVT) by subgroups of the Modified Intent-to-Treat (MITT) population, including subgroups based on age, gender, race, and region.

FIG. 2 shows a Forest Plot of overall success rate at EOIVT by subgroups of the MITT population, including subgroups based on creatinine clearance rate, diabetes status, SIRS status, and Charlson Comorbidity Score Category.

DETAILED DESCRIPTION OF EMBODIMENTS

Meropenem-vaborbactam is a beta-lactam antibiotic combination of the approved carbapenem, meropenem, and a new novel chemical class of a beta-lactamase inhibitor, vaborbactam. Meropenem is a broad-spectrum, injectable, carbapenem antibiotic that has been used worldwide for over 2 decades for the treatment of serious infections and is considered to be efficacious, safe, and well tolerated. Meropenem's spectrum of activity includes many gram-positive bacteria, gram-negative bacteria, and anaerobic bacteria. Vaborbactam is a beta-lactamase inhibitor from a new novel chemical class that was optimized for potent inhibition of Class A serine carbapenemases, specifically KPC. Vaborbactam restores the activity of carbapenems against KPC-producing CRE in vitro and in preclinical models of infection.

In some embodiments, meropenem-vaborbactam is used to address resistance due to KPC-producing CRE. In some embodiments, the dosage regimen is meropenem 2 g plus vaborbactam 2 g as a 3-hour infusion every 8 hours; this dosage and prolonged infusion regimen optimizes the PK-PD properties of both drugs and reduces the development of resistance.

Definitions

As used herein, common organic abbreviations are defined as follows:
AE Adverse Event
AP Acute Pyelonephritis
AUC Area Under the Concentration-time Curve
BAT Best Available Therapy
BMI Body Mass Index
BUN Blood Urea Nitrogen
CI Confidence Interval
cIAI Complicated Intra-abdominal Infection
CL Clearance
$C_{max}$ Maximum Plasma Concentration
CrCl Creatinine Clearance
CRE Carbapenem-resistant Enterobacteriaceae
cUTI Complicated Urinary Tract Infection
*E. coli* *Escherichia coli*
EOIVT End of Intravenous Treatment
EOT End of Treatment
ESBL Extended-Spectrum Beta-Lactamase
h Hours
HABP Hospital-acquired Bacterial Pneumonia
ITT Intent-to-Treat
IV Intravenous
*K. pneumoniae* *Klebsiella pneumoniae*
KPC *Klebsiella pneumoniae* Carbapenemase
LCE Leukocyte Esterase
LLN Lower Limit of Normal
LTAC Long-Term Acute Care
ME Microbiological Evaluable
MIC Minimal Inhibitory Concentration
Min Minutes
MITT Modified Intent-to-Treat
m-MITT Microbiological Modified Intent-to-Treat
M-V Meropenem-vaborbactam
P Persistence
PaCO2 Arterial Partial Pressure of Carbon Dioxide
PCS Potentially Clinically Significant
PD Pharmacodynamic
PK Pharmacokinetic
PMN Polymorphonuclear Leukocyte
P-T Piperacillin/Tazobactam
q8h Every 8 Hours
q24h Once Every 24 Hours
qd Once Daily
SAE Serious Adverse Event
SD Standard Deviation
SIRS Systemic Inflammatory Response Syndrome
$t_{1/2}$ Half-Life
TEAE Treatment-Emergent Adverse Event
TOC Test of Cure
$T_{max}$ Time to Maximum Plasma Concentration
ULN Upper Limit of Normal
UTI Urinary Tract Infection
VABP Ventilator-acquired Bacterial Pneumonia The term "agent" or "test agent" includes any substance, molecule, element, compound, entity, or a combination thereof. It includes, but is not limited to, e.g., protein, polypeptide, peptide or mimetic, small organic molecule, polysaccharide, polynucleotide, and the like. It can be a natural product, a synthetic compound, or a chemical compound, or a combination of two or more substances. Unless otherwise specified, the terms "agent", "substance", and "compound" are used interchangeably herein.

The term "acute pyelonephritis" or "AP" is defined as an acute infection of the renal pelvis or parenchyma associated with clinical signs and symptoms.

The term "complicated urinary tract infection" or "cUTI" is defined as a urinary infection occurring in a subject with a structural or functional abnormality of the genitourinary tract associated with clinical signs and symptoms.

The term "complicated intra-abdominal infection" or "cIAI" is defined as an infection in the abdominal cavity which extends beyond the hollow viscus of origin (bowel, stomach, gallbladder, etc.) into the peritoneal space and that was associated with either abscess formation or peritonitis with clinical signs and symptoms.

The term "hospital-acquired bacterial pneumonia" or "HABP" is defined as an acute infection of the pulmonary parenchyma that was associated with clinical signs and symptoms and a new pulmonary infiltrate in a subject hospitalized for more than 48 hours or in a subject admitted from a long-term acute care or rehabilitation center or admitted from home≤7 days after discharge from a hospital or health care facility.

The term "ventilator-acquired bacterial pneumonia" or "VABP" is defined as an acute infection of the pulmonary parenchyma that was associated with clinical signs and symptoms and a new pulmonary infiltrate beginning more than 48 hours after a subject received ventilatory support via an endotracheal (or nasotracheal) tube.

The term "bacteremia" is defined as by the presence of a bacterial pathogen in a blood culture that was not a contaminant. Subjects having an indication of bacteremia may not have concurrent HABP, VABP, cIAI, or cUTI/AP infections. However, subjects with HABP, VABP, or cUTI/AP may also have had concurrent secondary bacteremia.

The term "systemic inflammatory response syndrome" or "SIRS" as used herein, refers to an inflammatory state affecting the whole body as the body's response to an infectious or noninfectious insult. In some instances, the adult SIRS criteria include, but not limited to body temperature less than 36° C. or more than 38° C., heart rate more than 90 bpm, respiratory rate greater than 20 breaths/min or an arterial partial pressure of carbon dioxide less than 4.3 kPa (32 mmHg), and white blood cell count more than 12,000 cells/mm$^3$ or less than 4,000 cells/mm$^3$, or the presence of greater than 10% immature neutrophils (band forms).

The term "Charlson comorbidity score" as used herein, refers to the score of the Charlson comorbidity index. The Charlson comorbidity index predicts the one-year mortality for a patient who may have a range of comorbid conditions, such as heart disease, AIDS, or cancer. Each condition is assigned a score of 1, 2, 3, or 6, depending on the risk of dying associated with each one. Scores are summed to provide a total score to predict mortality. Non-exhaustive clinical conditions and associated scores are as follows:
 1: Myocardial infarct, congestive heart failure, peripheral vascular disease, dementia, cerebrovascular disease, chronic lung disease, connective tissue disease, ulcer, chronic liver disease, diabetes.
 2: Hemiplegia, moderate or severe kidney disease, diabetes with end organ damage, tumor, leukemia, lymphoma.
 3: Moderate or severe liver disease.

The term "mammal" is used in its usual biological sense. Thus, it specifically includes humans, cattle, horses, dogs, cats, rats and mice but also includes many other species.

The term "microbial infection" refers to the invasion of the host organism, whether the organism is a vertebrate, invertebrate, fish, plant, bird, or mammal, by pathogenic microbes. This includes the excessive growth of microbes that are normally present in or on the body of a mammal or other organism. More generally, a microbial infection can be any situation in which the presence of a microbial population(s) is damaging to a host mammal. Thus, a mammal is "suffering" from a microbial infection when excessive numbers of a microbial population are present in or on a mammal's body, or when the effects of the presence of a microbial population(s) is damaging the cells or other tissue of a mammal. Specifically, this description applies to a bacterial infection. Note that the compounds of preferred embodiments are also useful in treating microbial growth or contamination of cell cultures or other media, or inanimate surfaces or objects, and nothing herein should limit the preferred embodiments only to treatment of higher organisms, except when explicitly so specified in the claims.

The term "pharmaceutically acceptable carrier" or "pharmaceutically acceptable excipient" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the therapeutic compositions is contemplated. Supplementary active ingredients can also be incorporated into the compositions. In addition, various adjuvants such as are commonly used in the art may be included. These and other such compounds are described in the literature, e.g., in the Merck Index, Merck & Company, Rahway, NJ Considerations for the inclusion of various components in pharmaceutical compositions are described, e.g., in Gilman et al. (Eds.) (1990); Goodman and Gilman's: The Pharmacological Basis of Therapeutics, 8th Ed., Pergamon Press.

The term "pharmaceutically acceptable salt" refers to salts that retain the biological effectiveness and properties of the compounds of the preferred embodiments and, which are not biologically or otherwise undesirable. In many cases, the compounds of the preferred embodiments are capable of forming acid and/or base salts by virtue of the presence of amino and/or carboxyl groups or groups similar thereto. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, aluminum, and the like; particularly preferred are the ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in WO 87/05297, Johnston et al., published Sep. 11, 1987 (incorporated by reference herein in its entirety).

"Solvate" refers to the compound formed by the interaction of a solvent and an EPI, a metabolite, or salt thereof. Suitable solvates are pharmaceutically acceptable solvates including hydrates.

"Subject" as used herein, means a human or a non-human mammal, e.g., a dog, a cat, a mouse, a rat, a cow, a sheep, a pig, a goat, a non-human primate or a bird, e.g., a chicken, as well as any other vertebrate or invertebrate.

A therapeutic effect relieves, to some extent, one or more of the symptoms of the infection, and includes curing an infection. "Curing" means that the symptoms of active infection are eliminated, including the elimination of excessive members of viable microbe of those involved in the infection. However, certain long-term or permanent effects of the infection may exist even after a cure is obtained (such as extensive tissue damage).

"Treat," "treatment," or "treating," as used herein refers to administering a pharmaceutical composition for prophylactic and/or therapeutic purposes. The term "prophylactic treatment" refers to treating a patient who is not yet infected, but who is susceptible to, or otherwise at risk of, a particular infection, whereby the treatment reduces the likelihood that the patient will develop an infection. The term "therapeutic treatment" refers to administering treatment to a patient already suffering from an infection.

Methods of Treatment

Some embodiments of the present disclosure relate to methods of treating urinary tract infection (UTI) or acute pyelonephritis (AP), comprising administering a combination of an amount of vaborbactam or a pharmaceutically acceptable salt thereof and an amount of meropenem to a subject in need thereof:

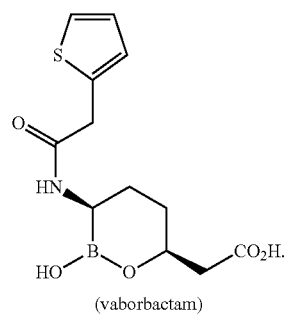 [SMILES: O=C(O)C[C@@H]1CC[C@H](NC(=O)Cc2cccs2)B(O)O1]
(vaborbactam)

In some embodiments, the subject treated by the method described above is a mammal. In some further embodiments, the subject is a human. In some embodiments, the subject is a female. In some embodiments, the subject has a creatinine clearance rate of equal to or greater than 30 mL/min. In some embodiments, the subject has a creatinine clearance rate of equal to or greater than 40 mL/min. In some embodiments, the subject has a systemic inflammatory response syndrome (SIRS). In some other embodiments, the subject has a Charlson comorbidity score equal to or greater than 3.

Some embodiments of the present disclosure relate to methods of treating or ameliorating cUTI or AP in a subject in need thereof, comprising: selecting for treatment a subject having a systemic inflammatory response syndrome (SIRS)

who is also suffering from cUTI or AP; and administering a combination of an amount of vaborbactam or a pharmaceutically acceptable salt thereof and an amount of meropenem to the subject. In some embodiments, the subject has one or more of the following characteristics at the time of treatment: body temperature less than 36° C. or more than 38° C., heart rate more than 90 bpm, respiratory rate greater than 20 breaths/min, an arterial partial pressure of carbon dioxide less than 4.3 kPa (32 mmHg), white blood cell count more than 12,000 cells/mm$^3$ or less than 4,000 cells/mm$^3$, or the presence of greater than 10% immature neutrophils. In some embodiments, the subject is a female. In some embodiments, the subject has a creatinine clearance rate of equal to or greater than 30 mL/min. In some embodiments, the subject has a creatinine clearance rate of equal to or greater than 40 mL/min.

Some embodiments of the present disclosure relate to methods of treating or ameliorating cUTI or AP in a subject in need thereof, comprising: selecting for treatment a subject having a Charlson comorbidity score of equal to or greater than 3, who is also suffering from cUTI or AP; and administering a combination of an amount of vaborbactam or a pharmaceutically acceptable salt thereof and an amount of meropenem to the subject. In some embodiments, the subject is a female. In some embodiments, the subject has a creatinine clearance rate of equal to or greater than 30 mL/min. In some embodiments, the subject has a creatinine clearance rate of equal to or greater than 40 mL/min.

In some embodiments of the methods described herein, the subject is suffering from cUTI. In some other embodiments, the subject is suffering from AP. In some embodiments, the subject is also suffering from concomitant bacteremia. In some further embodiments, the administration continues for at least five days.

In some embodiments of the methods described herein, the cUTI or AP is caused by Carbapenem-resistant Enterobacteriaceae (CRE). In some embodiments, the cUTI or AP is caused by a baseline pathogen selected from the group consisting of *E. coli, K. pneumoniae, Enterococcus faecalis, Proteus mirabilis, Enterobacter cloacae* species complex, and *P. aeruginosa*, or combinations thereof.

In some embodiments, the method provides a higher success rate in the treatment of cUTI and/or AP as compared to a subject treated with a combination of piperacillin and tazobactam. For example, the method described herein provides at least about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 120%, about 140%, about 160%, about 180%, or about 200% higher success rate in the treating of cUTI and/or AP. The success rate may include the success rate both at the end of treatment (EOT) period or the time of cure (TOC). Overall success includes clinical cure, improvement, or eradication of baseline pathogen to <10$^4$ CFU/ml.

In some embodiments, the amount of vaborbactam or the pharmaceutically acceptable salt thereof is about 2 g and the amount of meropenem is about 2 g. In some other embodiments, the amount of vaborbactam or the pharmaceutically acceptable salt thereof is about 1 g and the amount of meropenem is about 1 g for treating cUTI or AP in a subject with impaired renal function, for example, in a subject having a creatinine clearance rate of equal to or greater than 20-39 mL/min or 10-19 mL/min. In some further embodiments, the amount of vaborbactam or the pharmaceutically acceptable salt thereof is about 0.5 g and the amount of meropenem is about 0.5 g for treating cUTI or AP in a subject with impaired renal function, for example, in a subject having a creatinine clearance rate of less than 20-39 mL/min.

Some embodiments of the present disclosure relate to methods of treating or ameliorating a serious infection due to carbapenem-resistant enterobacteriaceae (CRE) in a subject in need thereof, comprising: selecting for treatment a subject having a CRE infection that requires at least 7 days of treatment with intravenous antibiotics; and administering a combination of an amount of vaborbactam or a pharmaceutically acceptable salt thereof and an amount of meropenem to the subject. In some embodiments, the CRE infection is selected from the group consisting of cUTI, AP, cIAI, HABP, VABP, and bacteremia, and combinations thereof. In some embodiments, the subject is a female. In some embodiments, the subject has a creatinine clearance rate of equal to or greater than 30 mL/min. In some embodiments, the subject has a creatinine clearance rate of equal to or greater than 40 mL/min. In some embodiments, the subject has a systemic inflammatory response syndrome (SIRS). In some other embodiments, the subject has a Charlson comorbidity score equal to or greater than 3, or equal to or greater than 5.

In some such embodiments, the method provides less adverse events in the treatment of the CRE infection as compared to a subject treated with best available therapy. For example, the method provides at least about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% less adverse events in the treating of cUTI and/or AP. The adverse events may include, but not limited to diarrhea, sepsis, anemia, *Clostridium difficile* colitis, hypokalemia, renal impairment, septic shock, abdominal distension, asthenia, atrial fibrillation, confusional state, constipation, dyspnea, extrasystoles, headache, hypomagnesaemia, leukopenia, myalgia, nausea, pain, pulmonary embolism, acute renal failure, thrombocytopenia, increased transaminases, tremor, hypotension, and/or vomiting.

In some further embodiments, the method provides a higher success rate in the treatment of the CRE infection as compared to a subject treated with best available therapy. For example, the method provides at least about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 120%, about 140%, about 160%, about 180%, or about 200% higher success rate in the treatment of the CRE infection as compared to a subject treated with best available therapy. The success rate may include the success rate both at the end of treatment (EOT) period or the time of cure (TOC). Overall success includes clinical cure, improvement, or eradication of baseline pathogen to <10$^4$ CFU/ml. In some such embodiments, the best available therapy is selected from the group consisting of ciprofloxacin, polymyxin B, colistin, amikacin, meropenem, gentamicin, ertapenem, tigecycline, and ceftazidime-avibactam, and combinations thereof.

The combination of vaborbactam or pharmaceutically acceptable salt thereof and meropenem may be administered at least once a day, or twice a day (i.e., every 12 hours), or three times a day (i.e., every 8 hours). In one embodiment, the daily dose of vaborbactam or the pharmaceutically acceptable salt thereof is about 6.0 g and wherein the daily dose of meropenem is about 6.0 g. In some embodiments, the combination of vaborbactam or pharmaceutically acceptable salt thereof and meropenem is administered three times a day (i.e., every 8 hours) for at least 5 days, for 6 days, for 7 days, for 8 days, for 9 days, for 10 days, for 11 days, for 12 days, for 13 days, or for 14 days. some embodiments, the combination of vaborbactam or pharmaceutically acceptable salt thereof and meropenem is administered three times a day (i.e., every 8 hours) for from 5 days to 14 days, from 7 days to 14 days, from 7 days to 10 days, or from 8 days to 9 days.

In some embodiments, the combination of vaborbactam or pharmaceutically acceptable salt thereof and meropenem is administered intravenously as described herein followed by administration of an oral antibiotic after the IV treatment has concluded. Accordingly, in some embodiments, the combination of vaborbactam or pharmaceutically acceptable salt thereof and meropenem is administered intravenously for at least 5 days, for 6 days, for 7 days, for 8 days, for 9 days, for 10 days, for 11 days, for 12 days, for 13 days, or for 14 days followed by oral antibiotic therapy. In some embodiments, the oral antibiotic therapy is oral levofloxacin. In some embodiments, the combination of vaborbactam or pharmaceutically acceptable salt thereof and meropenem is administered intravenously until the subject is afebrile, the signs and symptoms of cUTI or AP at baseline are absent or have improved, any leukocytosis present at baseline has improved or resolved, ≥1 urine culture is negative for growth at 24 hours or exhibits growth with a colony count<$10^4$ colony forming units (CFU)/mL, and/or confirmed sterilization of the blood if the subject had concurrent bacteremia. In some embodiments, after these criteria have been met and IV therapy has stopped, the subject is administered an oral antibiotic therapy.

In one embodiment, the administration is by intravenous infusion. In some such embodiments, the intravenous infusion is completed in about 1 to about 5 hours. In some such embodiment, the infusion is completed in about 3 hours. In some embodiments, vaborbactam or pharmaceutically acceptable salt thereof is administered prior or subsequent to meropenem. In some other embodiments, vaborbactam or pharmaceutically acceptable salt thereof and meropenem are in a single dosage form. In some embodiments, the single dosage form further comprises a pharmaceutically acceptable excipient, diluent, or carrier.

In any embodiments of the methods described herein, the method may further comprise administering one or more additional medicaments selected from the group consisting of an antibacterial agent, antifungal agent, an antiviral agent, an anti-inflammatory agent, and an anti-allergic agent, and combinations thereof.

Indications

The compositions comprising vaborbactam and a carbapenem compound meropenem described herein can be used to treat various bacterial infections. In some embodiments, the compositions may be used to treat disorders or conditions that are caused by bacterial infection, including but not limited to complicated urinary tract infection (cUTI) or acute pyelonephritis (AP). In some further embodiments, the compositions may be used to treat severe gram-negative infections, for example, serious infections due to carbapenem-resistant enterobacteriaceae (CRE), including cUTI/AP, complicated intra-abdominal infection (cIAI), hospital-acquired bacterial pneumonia (HABP), ventilator-acquired bacterial pneumonia (VABP), and bacteremia, suspected or known to be caused by CRE. Bacterial infections that can be treated with a combination of vaborbactam and meropenem can comprise a wide spectrum of bacteria. Example organisms include gram-positive bacteria, gram-negative bacteria, aerobic and anaerobic bacteria, such as *Staphylococcus, Lactobacillus, Streptococcus, Sarcina, Escherichia, Enterobacter, Klebsiella, Pseudomonas, Acinetobacter, Mycobacterium, Proteus, Campylobacter, Citrobacter, Nisseria, Baccillus, Bacteroides, Peptococcus, Clostridium, Salmonella, Shigella, Serratia, Haemophilus, Brucella* and other organisms.

More examples of bacterial infections include *Pseudomonas aeruginosa, Pseudomonas fluorescens, Pseudomonas acidovorans, Pseudomonas alcaligenes, Pseudomonas putida, Stenotrophomonas maltophilia, Burkholderia cepacia, Aeromonas hydrophilia, Escherichia coli, Citrobacter freundii, Salmonella typhimurium, Salmonella typhi, Salmonella paratyphi, Salmonella enteritidis, Shigella dysenteriae, Shigella flexneri, Shigella sonnei, Enterobacter cloacae, Enterobacter aerogenes, Klebsiella pneumoniae, Klebsiella oxytoca, Serratia marcescens, Francisella tularensis, Morganella morganii, Proteus mirabilis, Proteus vulgaris, Providencia alcalifaciens, Providencia rettgeri, Providencia stuartii, Acinetobacter baumannii, Acinetobacter calcoaceticus, Acinetobacter haemolyticus, Yersinia enterocolitica, Yersinia pestis, Yersinia pseudotuberculosis, Yersinia intermedia, Bordetella pertussis, Bordetella parapertussis, Bordetella bronchiseptica, Haemophilus influenzae, Haemophilus parainfluenzae, Haemophilus haemolyticus, Haemophilus parahaemolyticus, Haemophilus ducreyi, Pasteurella multocida, Pasteurella haemolytica, Branhamella catarrhalis, Helicobacter pylori, Campylobacter fetus, Campylobacter jejuni, Campylobacter coli, Borrelia burgdorferi, Vibrio cholerae, Vibrio parahaemolyticus, Legionella pneumophila, Listeria monocytogenes, Neisseria gonorrhoeae, Neisseria meningitidis, Kingella, Moraxella, Gardnerella vaginalis, Bacteroides fragilis, Bacteroides distasonis, Bacteroides 3452A homology group, Bacteroides vulgatus, Bacteroides ovalus, Bacteroides thetaiotaomicron, Bacteroides uniformis, Bacteroides eggerthii, Bacteroides splanchnicus, Clostridium difficile, Mycobacterium tuberculosis, Mycobacterium avium, Mycobacterium intracellulare, Mycobacterium leprae, Corynebacterium diphtherias, Corynebacterium ulcerans, Streptococcus pneumoniae, Streptococcus agalactiae, Streptococcus pyogenes, Enterococcus faecalis, Enterococcus faecium, Staphylococcus aureus, Staphylococcus epidermidis, Staphylococcus saprophyticus, Staphylococcus intermedius, Staphylococcus hyicus subsp. hyicus, Staphylococcus haemolyticus, Staphylococcus hominis*, or *Staphylococcus saccharolyticus*.

In some embodiments, the infection is caused by a bacteria selected from *Pseudomonas aeruginosa, Pseudomonas fluorescens, Stenotrophomonas maltophilia, Escherichia coli, Citrobacter freundii, Salmonella typhimurium, Salmonella typhi, Salmonella paratyphi, Salmonella enteritidis, Shigella dysenteriae, Shigella flexneri, Shigella sonnei, Enterobacter cloacae, Enterobacter aerogenes, Klebsiella pneumoniae, Klebsiella oxytoca, Serratia marcescens, Acinetobacter calcoaceticus, Acinetobacter haemolyticus, Yersinia enterocolitica, Yersinia pestis, Yersinia pseudotuberculosis, Yersinia intermedia, Haemophilus influenzae, Haemophilus parainfluenzae, Haemophilus haemolyticus, Haemophilus parahaemolyticus, Helicobacter pylori, Campylobacter fetus, Campylobacter jejuni, Campylobacter coli, Vibrio cholerae, Vibrio parahaemolyticus, Legionella pneumophila, Listeria monocytogenes, Neisseria gonorrhoeae, Neisseria meningitidis, Moraxella, Bacteroides fragilis, Bacteroides vulgatus, Bacteroides ovalus, Bacteroides*

*thetaiotaomicron, Bacteroides uniformis, Bacteroides eggerthii,* or *Bacteroides splanchnicus.*

Antibacterial Compounds

Vaborbactam has the structures shown as follows:

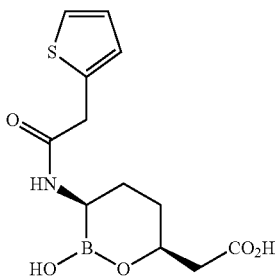 [SMILES: O=C(O)C[C@@H]1CC[C@H](NC(=O)Cc2cccs2)B(O)O1]

In some embodiments, due to the facile exchange of boron esters, vaborbactam may convert to or exist in equilibrium with alternate forms. Accordingly, in some embodiments, vaborbactam may exist in combination with one or more of these forms. For example, vaborbactam may exist in combination with one or more open-chain form (Formula Ia), dimeric form (Formula Ib), cyclic dimeric form (Formula Ic), trimeric form (Formula Id), cyclic trimeric form (Formula Ie), and the like. Vaborbactam and its enantiomer, diastereoisomer or tautomer, or pharmaceutically acceptable salt is described in U.S. Pat. No. 8,680,136, which is incorporated by reference in its entirety.

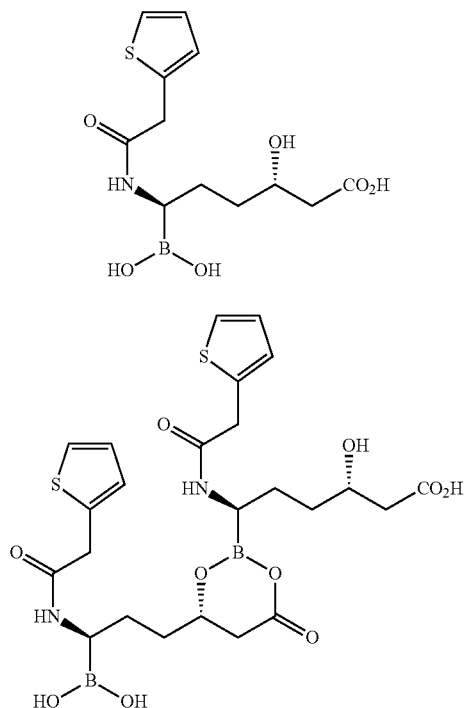

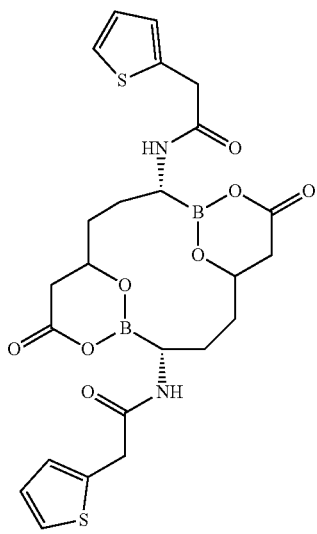

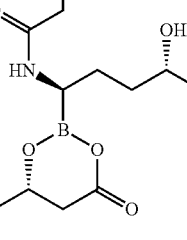

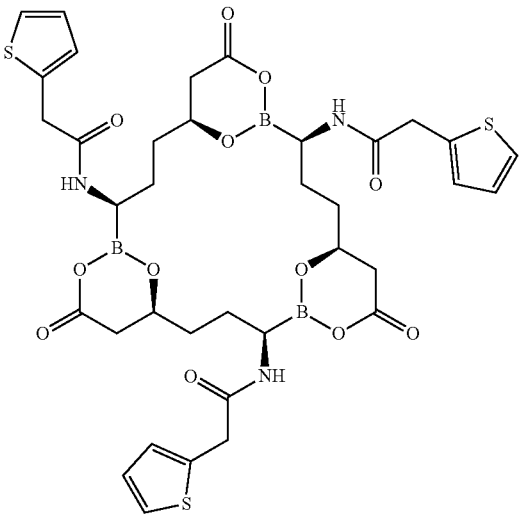

Meropenem is an ultra-broad-spectrum injectable antibiotic used to treat a wide variety of infections. It is a β-lactam and belongs to the subgroup of carbapenem. It has the structure shown as follows:

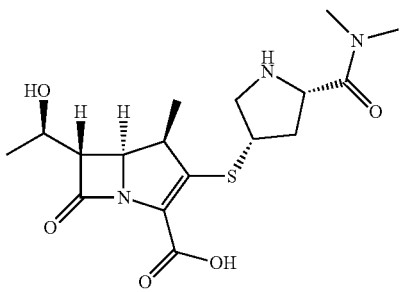 [SMILES: C[C@@H](O)[C@H]1C(=O)N2C(C(=O)O)=C(S[C@@H]3CN[C@H](C(=O)N(C)C)C3)[C@H](C)[C@H]12]

Some embodiments include methods for treating or preventing cUTI or AP comprising administering to a subject in need thereof, an effective amount of vaborbactam and meropenem, wherein vaborbactam can be in any one of the forms described above or a combination thereof.

Some embodiments further comprise administering an additional medicament, either is a separate composition or in the same composition. In some embodiments, the additional medicament includes an antibacterial agent, antifungal agent, an antiviral agent, an anti-inflammatory agent or an anti-allergic agent. In some embodiments, the additional medicament comprises an antibacterial agent such as an additional β-lactam.

In some embodiments, the additional β-lactam includes Amoxicillin, Ampicillin (Pivampicillin, Hetacillin, Bacampicillin, Metampicillin, Talampicillin), Epicillin, Carbenicillin (Carindacillin), Ticarcillin, Temocillin, Azlocillin, Piperacillin, Mezlocillin, Mecillinam (Pivmecillinam), Sulbenicillin, Benzylpenicillin (G), Clometocillin, Benzathine benzylpenicillin, Procaine benzylpenicillin, Azidocillin, Penamecillin, Phenoxymethylpenicillin (V), Propicillin, Benzathine phenoxymethylpenicillin, Pheneticillin, Cloxacillin (Dicloxacillin, Flucloxacillin), Oxacillin, Meticillin, Nafcillin, Faropenem, Biapenem, Doripenem, Ertapenem, Imipenem, Panipenem, Tomopenem, Razupenem, Tebipenem, Sulopenem, Cefazolin, Cefacetrile, Cefadroxil, Cefalexin, Cefaloglycin, Cefalonium, Cefaloridine, Cefalotin, Cefapirin, Cefatrizine, Cefazedone, Cefazaflur, Cefradine, Cefroxadine, Ceftezole, Cefaclor, Cefamandole, Cefminox, Cefonicid, Ceforanide, Cefotiam, Cefprozil, Cefbuperazone, Cefuroxime, Cefuzonam, Cefoxitin, Cefotetan, Cefmetazole, Loracarbef, Cefixime, Ceftazidime, Ceftriaxone, Cefcapene, Cefdaloxime, Cefdinir, Cefditoren, Cefetamet, Cefmenoxime, Cefodizime, Cefoperazone, Cefotaxime, Cefpimizole, Cefpiramide, Cefpodoxime, Cefsulodin, Cefteram, Ceftibuten, Ceftiolene, Ceftizoxime, Flomoxef, Latamoxef, Cefepime, Cefozopran, Cefpirome, Cefquinome, Ceftobiprole, Ceftaroline, Ceftolozane, CXA-101, RWJ-54428, MC-04,546, ME1036, BAL30072, SYN 2416, Ceftiofur, Cefquinome, Cefovecin, Aztreonam, Tigemonam, Carumonam, RWJ-442831, RWJ-333441, RWJ-333442, S649266, GSK3342830, AIC 499, levofloxacin, tazobactam, tigecycline, amikacin, tobramycin, gentamicin, polymyxin B, and ceftazidime-avibactam.

Administration and Pharmaceutical Compositions

Some embodiments include pharmaceutical compositions comprising: (a) a safe and therapeutically effective amount of vaborbactam, or its corresponding enantiomer, diastereoisomer or tautomer, or pharmaceutically acceptable salt; (b) meropenem, and (c) a pharmaceutically acceptable carrier.

Vaborbactam and meropenem are administered at a therapeutically effective dosage, e.g., a dosage sufficient to provide treatment for the disease states previously described. In some embodiments, a single dose of vaborbactam and meropenem may range from about 500 mg to about 2000 mg. In some embodiments, vaborbactam and meropenem can be administered at least once a day, for example 1 to 5 times a day, or 3 times a day. In one embodiment, a sing dose of vaborbactam and meropenem is administered as 2 g/2 g via 3-hour intravenous infusion every 8 hours.

Administration of the combination comprising vaborbactam or the pharmaceutically acceptable salt thereof and meropenem can be via any of the accepted modes of administration for agents that serve similar utilities including, but not limited to, orally, subcutaneously, intravenously, intranasally, topically, transdermally, intraperitoneally, intramuscularly, intrapulmonarilly, vaginally, rectally, or intraocularly. Intravenous, oral and parenteral administrations are customary in treating the indications that are the subject of the preferred embodiments.

Vaborbactam and meropenem can be formulated into pharmaceutical compositions for use in treatment of these conditions. Standard pharmaceutical formulation techniques are used, such as those disclosed in Remington's The Science and Practice of Pharmacy, 21st Ed., Lippincott Williams & Wilkins (2005), incorporated by reference in its entirety.

In addition to vaborbactam and meropenem, some embodiments include compositions containing a pharmaceutically-acceptable carrier. The term "pharmaceutically-acceptable carrier", as used herein, means one or more compatible solid or liquid filler diluents or encapsulating substances, which are suitable for administration to a mammal. The term "compatible", as used herein, means that the components of the composition are capable of being commingled with the subject compound, and with each other, in a manner such that there is no interaction, which would substantially reduce the pharmaceutical efficacy of the composition under ordinary use situations. Pharmaceutically-acceptable carriers must, of course, be of sufficiently high purity and sufficiently low toxicity to render them suitable for administration preferably to an animal, preferably mammal being treated.

Some examples of substances, which can serve as pharmaceutically-acceptable carriers or components thereof, are sugars, such as lactose, glucose and sucrose; starches, such as corn starch and potato starch; cellulose and its derivatives, such as sodium carboxymethyl cellulose, ethyl cellulose, and methyl cellulose; powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroma; polyols such as propylene glycol, glycerine, sorbitol, mannitol, and polyethylene glycol; alginic acid; emulsifiers, such as the TWEENS; wetting agents, such sodium lauryl sulfate; coloring agents; flavoring agents; tableting agents, stabilizers; antioxidants; preservatives; pyrogen-free water; isotonic saline; and phosphate buffer solutions.

The choice of a pharmaceutically-acceptable carrier to be used in conjunction with the combination is basically determined by the way the combination is to be administered.

The compositions described herein are preferably provided in unit dosage form. As used herein, a "unit dosage form" is a composition containing an amount of a compound that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. The skilled artisan will appreciate that oral and nasal compositions comprise compositions that are administered by inhalation, and made using available methodologies. Depending upon the particular route of administration desired, a variety of pharmaceutically-acceptable carriers well-known in the art may be used. Pharmaceutically-acceptable carriers include, for example, solid or liquid fillers, diluents, hydrotropies, surface-active agents, and encapsulating substances. Optional pharmaceutically-active materials may be included, which do not substantially interfere with the inhibitory activity of the compound. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms: Tablets (1989); and Ansel, Introduction to Pharmaceutical Dosage Forms 8th Edition (2004). In some embodiments, the pharmaceutical compositions are administered intravenously.

Compositions described herein may optionally include other drug actives.

Other compositions useful for attaining systemic delivery of the subject compounds include sublingual, buccal and nasal dosage forms. Such compositions typically comprise one or more of soluble filler substances such as sucrose, sorbitol and mannitol; and binders such as acacia, microcrystalline cellulose, carboxymethyl cellulose and hydroxypropyl methyl cellulose. Glidants, lubricants, sweeteners, colorants, antioxidants and flavoring agents disclosed above may also be included.

A liquid composition, which is formulated for topical ophthalmic use, is formulated such that it can be administered topically to the eye. The comfort should be maximized as much as possible, although sometimes formulation considerations (e.g. drug stability) may necessitate less than optimal comfort. In the case that comfort cannot be maximized, the liquid should be formulated such that the liquid is tolerable to the patient for topical ophthalmic use. Additionally, an ophthalmically acceptable liquid should either be packaged for single use, or contain a preservative to prevent contamination over multiple uses.

Preservatives that may be used in the pharmaceutical compositions disclosed herein include, but are not limited to, benzalkonium chloride, PHMB, chlorobutanol, thimerosal, phenylmercuric, acetate and phenylmercuric nitrate. A useful surfactant is, for example, Tween 80. Likewise, various useful vehicles may be used in the ophthalmic preparations disclosed herein. These vehicles include, but are not limited to, polyvinyl alcohol, povidone, hydroxypropyl methyl cellulose, poloxamers, carboxymethyl cellulose, hydroxyethyl cellulose and purified water.

Tonicity adjustors may be added as needed or convenient. They include, but are not limited to, salts, particularly sodium chloride, potassium chloride, mannitol and glycerin, or any other suitable ophthalmically acceptable tonicity adjustor.

Various buffers and means for adjusting pH may be used so long as the resulting preparation is ophthalmically acceptable. For many compositions, the pH will be between 4 and 9. Accordingly, buffers include acetate buffers, citrate buffers, phosphate buffers and borate buffers. Acids or bases may be used to adjust the pH of these formulations as needed.

For topical use, creams, ointments, gels, solutions or suspensions, etc., containing the compound disclosed herein are employed. Topical formulations may generally be comprised of a pharmaceutical carrier, co-solvent, emulsifier, penetration enhancer, preservative system, and emollient.

For intravenous administration, the compounds and compositions described herein may be dissolved or dispersed in a pharmaceutically acceptable diluent, such as a saline or dextrose solution. Suitable excipients may be included to achieve the desired pH, including but not limited to NaOH, sodium carbonate, sodium acetate, HCl, and citric acid. In various embodiments, the pH of the final composition ranges from 2 to 8, or preferably from 4 to 7. Antioxidant excipients may include sodium bisulfite, acetone sodium bisulfite, sodium formaldehyde, sulfoxylate, thiourea, and EDTA. Other non-limiting examples of suitable excipients found in the final intravenous composition may include sodium or potassium phosphates, citric acid, tartaric acid, gelatin, and carbohydrates such as dextrose, mannitol, and dextran. Further acceptable excipients are described in Powell, et al., Compendium of Excipients for Parenteral Formulations, PDA J Pharm Sci and Tech 1998, 52 238-311 and Nema et al., Excipients and Their Role in Approved Injectable Products: Current Usage and Future Directions, PDA J Pharm Sci and Tech 2011, 65 287-332, both of which are incorporated herein by reference in their entirety. Antimicrobial agents may also be included to achieve a bacteriostatic or fungistatic solution, including but not limited to phenylmercuric nitrate, thimerosal, benzethonium chloride, benzalkonium chloride, phenol, cresol, and chlorobutanol.

The resulting composition may be infused into the patient over a period of time. In various embodiments, the infusion time ranges from 5 minutes to continuous infusion, from 10 minutes to 8 hours, from 30 minutes to 4 hours, and from 1 hour to 3 hours. In one embodiment, the drug is infused over a 3 hour period. The infusion may be repeated at the desired dose interval, which may include, for example, 6 hours, 8 hours, 12 hours, or 24 hours.

The compositions for intravenous administration may be provided to caregivers in the form of one more solids that are reconstituted with a suitable diluent such as sterile water, saline or dextrose in water shortly prior to administration. Reconstituted concentrated solutions may be further diluted into a parenteral solutions having a volume of from about 25 to about 1000 ml, from about 30 ml to about 500 ml, or from about 50 ml to about 250 ml. In other embodiments, the compositions are provided in solution ready to administer parenterally. In still other embodiments, the compositions are provided in a solution that is further diluted prior to administration. In embodiments that include administering a combination of a compound described herein and another agent, the combination may be provided to caregivers as a mixture, or the caregivers may mix the two agents prior to administration, or the two agents may be administered separately.

Kits for Intravenous Administration

Some embodiments include a kit comprising vaborbactam and a carbapenem antibacterial agent Meropenem. In some embodiments, the kits are used for intravenous administration.

In one embodiment, both components are provided in a single sterile container. In the case of solids for reconstitution, the agents may be pre-blended and added to the container simultaneously or may be dry-powder filled into the container in two separate steps. In some embodiments, the solids are sterile crystalline products. In other embodiment, the solids are lyophiles. In one embodiment, both components are lyophilized together. Non-limiting examples of agents to aid in lyophilization include sodium or potassium phosphates, citric acid, tartaric acid, gelatin, and carbohydrates such as dextrose, mannitol, and dextran. One embodiment includes non-sterile solids that are irradiated either before or after introduction into the container.

In the case of a liquid, the agents may be dissolved or dispersed in a diluent ready for administration. In another embodiment, the solution or dispersion may be further diluted prior to administration. Some embodiments include providing the liquid in an IV bag. The liquid may be frozen to improve stability.

In one embodiment, the container includes other ingredients such as a pH adjuster, a solubilizing agent, or a dispersing agent. Non-limiting examples of pH adjusters include NaOH, sodium carbonate, sodium acetate, HCl, and citric acid.

In an alternative embodiment, the two components may be provided in separate containers. Each container may include a solid, solution, or dispersion. In such embodiments, the two containers may be provided in a single package or may be provided separately. In one embodiment, the compound described herein is provided as a solution while the additional agent (e.g., antibacterial agent) is provided as a solid ready for reconstitution. In one such embodiment, the solution of the compound described herein is used as the diluent to reconstitute the other agent.

In some embodiments, the kit may comprise comprises one or more additional medicaments selected from an antibacterial agent, antifungal agent, an antiviral agent, an anti-inflammatory agent, or an anti-allergic agent. The additional medicaments can be prepared in the same way as described above.

EXAMPLES

The following examples, including experiments and results achieved, are provided for illustrative purposes only and are not to be construed as limiting the present application.

Example 1

Example 1 provides a summary of a clinical study of Phase III, multicenter, double-blind, double-dummy, randomized, parallel-group study of the efficacy, safety, and tolerability of meropenem-vaborbactam compared with piperacillin/tazobactam in the treatment of adults with cUTI or AP.

Approximately 500 subjects with a clinical diagnosis of cUTI or AP and a clinical severity of illness (with or without bacteremia) to warrant the use of IV antibiotics for at least 5 days were to be enrolled and randomized in a 1:1 ratio to one of the following groups: Meropenem 2 g/vaborbactam 2 g IV infused in 250 mL normal saline over 3 hours plus a 100 mL normal saline IV infused over 30 minutes q8h; Piperacillin/tazobactam 4.5 g (piperacillin 4 g/tazobactam 0.5 g) IV infused in 100 mL normal saline over 30 minutes plus 250 mL normal saline IV infused over 3 hours q8h. A dose modification was required for meropenem-vaborbactam for subjects with an estimated CrCl less than 50 mL/min (Meropenem 1 g/vaborbactam 1 g, q8h). No dose adjustment was required for piperacillin/tazobactam for subjects with an estimated CrCl less than 50 mL/min.

An assessment of clinical outcome was performed on Day 3 of study treatment, on the last day of IV therapy (i.e., the End of IV Treatment [EOIVT]), on the last day of total therapy (i.e., End of Treatment [EOT]), at the Test of Cure (TOC) visit (EOT+7 days), and at the Late Follow-Up (LFU) visit (EOT+14 days). The visit activities at EOIVT and EOT were combined for subjects who did not switch to oral therapy. If a subject withdrew from the study early, study assessments were performed at an early termination visit.

The average duration of study participation for each subject was approximately 25 days, including 1 day for screening, 10 days of therapy, and 14 days for follow-up, with a potential maximum duration of study participation of 31 days (1 day for screening+14 days of therapy+16 days follow-up).

The Intent-to-Treat (ITT) Population included all subjects screened and randomized to study drug (i.e., meropenem vaborbactam or piperacillin/tazobactam).

The Modified Intent-to-Treat (MITT) Population included all subjects who met ITT criteria and received at least one dose of study drug.

The m-MITT Population included all subjects who met the MITT criteria and had a baseline bacterial pathogen(s) of $\geq 10^5$ CFU/mL of urine at baseline urine culture for evaluation or the same bacterial pathogen present in concurrent blood and urine cultures. Subjects who only had an identified gram-positive pathogen in the urine and who had received >48 hours of an antibiotic with only gram-positive coverage were not included in the m-MITT Population Key Inclusion/Exclusion Criteria For inclusion into the trial, subjects were required to fulfill certain criteria including: male or female≥18 years of age; weight≤185 kg; the subject's cUTI or AP required initial treatment with at least 5 days of IV antibiotics. Any indwelling urinary catheter or instrumentation (including nephrostomy tubes and/or indwelling stents) would be removed or replaced (if removal is not clinically acceptable) before or as soon as possible, but not longer than 12 hours after randomization.

Subjects with creatinine clearance (CrCl)<30 mL/min using the Cockcroft-Gault formula were excluded from this study. In addition, subjects receiving any potentially therapeutic antibiotic agent within 48 hours before randomization were also excluded, with the following exceptions: A single dose of a short-acting oral or IV antibiotic (No more than 25% of subjects will be enrolled who meet this criterion); Subjects with unequivocal clinical evidence of treatment failure (i.e., worsening signs and symptoms); Subjects who develop signs and symptoms of cUTI or AP while on antibiotics for another indication.

A clinical outcome of either Cure, Improvement, Failure or Intermediate was assigned using the definitions specified in the table below.

subjects in the co-primary m-MITT and Microbiological Evaluable (ME) Populations who achieved a microbiologic outcome of eradication (i.e., baseline bacterial pathogen reduced to <$10^3$ CFU/mL of urine) at the TOC visit. Non-inferiority for both FDA and EMA primary endpoints will be concluded if the lower limit of the two sided 95% CI is >−15%.

| Category | Criteria |
|---|---|
| Cure | At EOIVT, the complete resolution or significant improvement of the baseline signs and symptoms of cUTI or AP. At EOT, TOC, and LFU, the complete resolution or significant improvement of the baseline signs and symptoms of cUTI or AP such that no further antimicrobial therapy was warranted. Symptom resolution did not necessarily include baseline symptoms associated with anatomic abnormalities that predisposed to cUTI such as symptoms associated with the presence of an indwelling urinary catheter. This outcome category was used only at the EOIVT, EOT, TOC, and LFU visits. |
| Improvement | Lessening, incomplete resolution, or no worsening of baseline clinical signs and symptoms of cUTI or AP, but continued IV therapy was warranted. This outcome category was used only at Day 3 and the EOIVT visits. |
| Failure | Subjects who experienced any one of the following: At any study visit, worsening of baseline clinical signs and symptoms of cUTI or AP or the development of new clinical signs and symptoms of infection, sufficient to stop study drug and initiate a nonstudy antimicrobial At EOT, TOC, and LFU visits, persistence, incomplete resolution of baseline clinical signs and symptoms of infection Withdrawal from the silidy due to an AE or due to lack of clinical improvement Death of the subject during the Study |
| Indeterminate | Clinical outcome cannot be determined. |

AE = adverse event;
AP = acute pyelonephritis;
cUTI = complicated urinary tract infection;
EOIVT = End of intravenous Treatment;
EOT = End of Treatment;
IV = intravenous;
LFU = Late Follow-Up;
TOC = Test of Cure.

The criteria for microbiological outcome are defined in the table below.

The study population and subject disposition (MITT) are summarized in Table 1 and Table 2 below respectively.

| Category | Criteria |
|---|---|
| Eradication | Baseline bacterial pathogen(s) was reduced to <$10^4$ CFU/mL on urine culture (FDA) or <$10^3$ CFU/mL (EMA) AND A negative blood culture for an organism that was identified as a uropathogen (if repeated after positive at baseline blood culture) |
| Persistence | One or more of the baseline bacterial pathogen(s) was continuously present at ≥$10^4$ CFU/mL on urine culture (FDA) or ≥$10^3$ CFU/mL (EMA) OR A continuously positive blood culture with an organism that was identified as a uropathogen |
| Recurrence | Isolation of the same baseline bacterial pathogen(s) from culture after a response of eradication OR A positive blood culture with the same baseline organism that was identified as a uropathogen after a response of eradication |
| Indeterminate | No urine culture or the urine culture could not be interpreted for any reason |

CFU = colony forming units;
EMA = European Medicines Agency;
FDA = Food and Drug Administration.

Primary Efficacy Endpoint

The primary efficacy endpoint for the FDA was the proportion of subjects in the Microbiological Modified Intent-to-Treat (m-MITT) Population who achieved overall success (clinical cure or improvement and eradication of baseline pathogen to <$10^4$ CFU/ml) at the EOIVT visit. The primary efficacy endpoint for the EMA was the proportion of

TABLE 1

| Populations | Meropenem-vaborbactam N = 274 n (%) | Piperacillin/tazobactam N = 276 n (%) | Total N = 550 n (%) |
|---|---|---|---|
| Intention to Treat (ITT) | 274 (100) | 276 (100) | 550 (100) |

TABLE 1-continued

| Populations | Meropenem-vaborbactam N = 274 n (%) | Piperacillin/tazobactam N = 276 n (%) | Total N = 550 n (%) |
|---|---|---|---|
| Modified Intention to Treat (MITT)/Safety | 272 (99.3) | 273 (98.9) | 545 (99.1) |
| Microbiologic Modified Intention to Treat (m-MITT) | 192 (70.1) | 182 (65.9) | 374 (68.0) |
| Microbiologic Evaluable (ME) | 178 (65.0) | 169 (61.2) | 347 (63.1) |

TABLE 2

| Subject Disposition | Meropenem-vaborbactam N = 272 n (%) | Piperacillin/tazobactam N = 273 n (%) | Total N = 545 n (%) |
|---|---|---|---|
| Subjects who completed study treatment | 249 (91.5) | 235 (86.1) | 484 (88.8) |
| Commonest reasons for DC of study drug: | 8 (2.9) | 13 (4.8) | 21 (3.9) |
| Physician Decision | 6 (2.2) | 14 (5.1) | 20 (3.7) |
| Adverse event | 7 (2.6) | 4 (1.5) | 11 (2.0) |
| Withdrawal by subject | | | |
| Subjects who completed study | 258 (94.9) | 250 (91.6) | 508 (93.2) |

The baseline characteristics of the MITT group are summarized in Table 3.

TABLE 3

| Subject Baseline Characteristics | Meropenem-vaborbactam N = 272 n (%) | Piperacillin/tazobactam N = 273 n (%) | Total N = 545 n (%) |
|---|---|---|---|
| Acute pyelonephritis | 161 (59.2) | 161 (59.0) | 322 (59.1) |
| Complicated UTI | 111 (40.8) | 112 (41.0) | 233 (40.9) |
| Age-years: mean (sd) | 53 (19.4) | 52.6 (20.9) | 52.8 (20.2) |
| >65 years | 87 (32.0) | 103 (37.7) | 190 (34.9) |
| Women | 181 (66.5) | 180 (65.9) | 361 (66.2) |
| Creatinine clearance-ml/min: mean (sd) | 93.5 (34.4) | 89.2 (36.4) | 91.3 (35.4) |
| ≤50 ml/min | 31 (11.4) | 37 (13.5) | 68 (12.4) |
| Diabetes mellitus | 42 (15.4) | 44 (16.1) | 86 (15.8) |
| Systemic Inflammatory Response Syndrome | 77 (28.3) | 90 (33.0) | 167 (30.6) |
| Charlson Comorbidity Index Score ≥3 | 143 (52.6) | 147 (53.8) | 290 (53.2) |

The baseline pathogens in the m-MITT group in at least 15 subjects are summarized in Table 4.

TABLE 4

| Baseline Pathogens | Meropenem-vaborbactam N = 192 n (%) | Piperacillin/tazobactam N = 182 n (%) | Total N = 374 n (%) |
|---|---|---|---|
| E. coli | 125 (65.1) | 117 (64.3) | 242 (64.7) |
| K. pneumoniae | 30 (15.6) | 28 (15.4) | 58 (15.5) |
| Enterococcus faecalis | 13 (6.8) | 14 (7.7) | 27 (7.2) |
| Proteus mirabilis | 6 (3.1) | 12 (6.6) | 18 (4.8) |
| Enterobacter cloacae species complex | 10 (5.2) | 5 (2.7) | 15 (4.0) |
| P. aeruginosa | 5 (2.6) | 10 (5.5) | 15 (4.0) |

Efficacy Results Discussion

Noninferiority for FDA's primary efficacy endpoint, overall success at EOIVT in the m-MITT Population, a composite endpoint of clinical (i.e., Cure or Improvement) and microbiologic (Eradication/presumed Eradication) outcomes, was met. Overall success was seen in a higher proportion of subjects in the meropenem-vaborbactam group (98.4%) than in the piperacillin/tazobactam group (94.0%), with a treatment difference of 4.5% and 95% CI of (0.7%, 9.1%) (Table 5A). Because the lower limit of the 95% CI is greater than the pre-specified noninferiority margin of −15%, meropenem-vaborbactam is noninferior to piperacillin/tazobactam. Additionally, because the lower limit of the 95% CI is also greater than 0%, meropenem-vaborbactam is superior to piperacillin/tazobactam.

Overall success rates were higher in the meropenem-vaborbactam group compared to the piperacillin/tazobactam group in subjects with AP (97.5% and 94.1%, respectively), subjects with cUTI and a removable source of infection (100% and 92.1%, respectively), and subjects with cUTI and a nonremovable source of infection (100% and 95.3%). The lower limit of the 95% CI was greater than −15% in each infection type, demonstrating that meropenem-vaborbactam is noninferior to piperacillin/tazobactam for overall success in subjects with AP and subjects with cUTI and either a removable or nonremovable source of infection.

TABLE 5A

| FDA Primary Endpoint | Meropenem-Vaborbactam N = 192 | Piperacillin/Tazobactam N = 182 |
|---|---|---|
| Overall Success at EOIVT mMITT Population | 189/192 (98.4%) | 171/182 (94.0%) |
| Difference (95% CI) | 4.5 (0.7, 9.1) | |

Noninferiority for EMA's primary efficacy endpoint, eradication rate at TOC in the m-MITT and ME Populations, was met. Eradication rates at TOC were higher in the meropenem-vaborbactam group compared to the piperacillin/tazobactam group in both the m-MITT (66.7% versus 57.7%) and ME (66.3% and 60.4%) Populations. The treatment difference and 95% CI was 9.0% and (−0.9%, 18.7%) for the m-MITT Population and 5.9% (−4.2%, 16%) for the ME Population (Table 5B). Based on these data, meropenem-vaborbactam is noninferior to piperacillin/tazobactam because the lower limit of the 95% CI for the group difference in both the m-MITT and ME Populations is greater than the pre-specified noninferiority margin of −15%.

Eradication rates at TOC in the m-MITT and ME Populations were higher in both groups in subjects with AP compared to subjects with cUTI. In the meropenem-vaborbactam and piperacillin/tazobactam groups, eradication rates at TOC in the m-MITT Population were 74.2% and 63.4% in subjects with AP compared to 60.0% and 52.6% in subjects with cUTI and a removable source of infection and 48.6% and 48.8% in subjects with cUTI and a nonremovable source of infection. In the ME Population, eradication rates at TOC were 74.8% and 67.4% in subjects with AP compared to 58.8% and 55.9% in subjects with cUTI and a removable source of infection and 45.5% and 48.8% in subjects with cUTI and a nonremovable source of infection. The lower limit of the 95% CI was greater than −15% in the m-MITT and ME Populations in subjects with AP, demonstrating that meropenem-vaborbactam is noninferior to piperacillin/tazobactam for eradication rates at TOC in subjects with AP.

TABLE 5B

| EMA Primary Endpoint Co-Primary | Meropenem-Vaborbactam | Piperacillin/Tazobactam |
|---|---|---|
| Microbial Eradication at TOC mMITT Population | 128/192 (66.7%) | 105/182 (57.7%) |
| Difference (95% CI) | 9.0 (−0.9, 18.7) | |
| Microbial Eradication at TOC ME Population | 118/178 (66.3%) | 102/169 (60.4%) |
| Difference (95% CI) | 5.9 (−4.2, 16.0) | |

Overall success rates were higher in the meropenem-vaborbactam than in the piperacillin/tazobactam groups at EOIVT (98.4% and 94.0%) and TOC (74.5% and 70.3%), with a treatment difference and 95% CI of 4.5% and (0.7% and 9.1%) at EOIVT and 4.1% and (−4.9%, 13.2%) at TOC (Table 5C). Based on these data, meropenem-vaborbactam is noninferior to piperacillin/tazobactam because the lower limit of the 95% CI is greater than the pre-specified noninferiority margin of −15% at both EOIVT and TOC.

TABLE 5C

| Key Secondary Endpoint | Meropenem-Vaborbactam N = 192 | Piperacillin/Tazobactam N = 182 |
|---|---|---|
| Overall Success at TOC mMITT Population | 143/192 (74.5%) | 128/182 (70.3%) |
| Difference (95% CI) | 4.1 (−4.9, 13.2) | |

Subgroup Analyses

SIRS and Charlson Comorbidity Score

The Forest Plot of overcall success rate at EOIVT by subgroups (mITT population) is summarized in Tables 6A and 6B. Consistent treatment effects were seen in the meropenem-vaborbactam and piperacillin/tazobactam groups for FDA's primary efficacy endpoint, overall success at EOIVT, for subgroups based on age, gender, renal function (with the exception of CrCl<30 mL/min because there was only 1 subject in each group), diabetes status, SIRS status, Charlson comorbidity score, and geographic region. Overall success rates at EOIVT were similar in both groups in nonbacteremic subjects.

A consistent treatment effect was seen in the meropenem-vaborbactam and piperacillin/tazobactam groups for EMA's primary efficacy endpoint, eradication rates at TOC (EMA's CFU/mL criteria) in the m-MITT and ME Populations by age, gender, renal function (with the exception of CrCl<30 mL/min because there was only 1 subject in each group), diabetes status, SIRS status, Charlson comorbidity score, geographic region, and bacteremia status. In particular, Systemic inflammatory response syndrome (SIRS) status (Y/N) and Charlson comorbidity score (≤2; ≥3) at baseline were summarized below. SIRS status was calculated based on temperature (<36° C. or >38° C.), heart rate (>90 bpm), respiratory rate (>20 breaths/min or PaCO2<32 mmHg), and white blood cell count (>12,000 or <4,000 per µL or >10% bands). Charlson comorbidity score was determined at baseline by assessing patients' comorbid conditions, assigning the corresponding value, and summing the values. Patients were then stratified into 2 groups: Charlson comorbidity score of ≤2 and Charlson comorbidity score of ≥3.

Of 550 subjects who were randomized within the study, 374 (192 in the M-V group; 182 in the P-T group) were included in the m-MITT population. At baseline, the proportion of subjects in the M-V and P-T groups who met SIRS criteria was 28.6% and 33.5%, respectively. The proportion of subjects in the M-V and P-T groups who had a Charlson comorbidity score of ≥3 was 53.6 and 57.7% at baseline, respectively. A higher proportion of subjects with AP met SIRS criteria than did subjects with cUTI with either a removable or non-removable source of infection (Table 6C). Charlson comorbidity score was higher in subjects with cUTI, with a removable or non-removable source of infection, than in subjects with AP (Table 6D). At the EOIVT and TOC time points, consistent efficacy results for the primary study endpoint were seen in subjects across comorbidities defined by SIRS status and Charlson comorbidity score.

It was observed that at the EOIVT time point, overall success rates were similar between those with SIRS and those without SIRS (98.2% in M-V group with SIRS versus 95.1% in P-T group with SIRS; 98.5% in M-V group without SIRS versus 93.4% in P-T group without SIRS). Overall success rates in those with SIRS were higher in the M-V group vs the P-T group at the TOC time point (92.7% in M-V group with SIRS versus 72.1% in P-T group with SIRS; 67.2% in M-V group without SIRS versus 69.4% in P-T group without SIRS).

It was also observed that overall success rates at EOIVT and TOC were lower in subjects with a Charlson comorbidity score of ≥3 vs ≤2 (98.2% in M-V group with score≤2 versus 97.4% in P-T group with score≤2; 66.0% in M-V group with score≥3 versus 59.0% in P-T group with score≥3).

Overall success in the m-MITT population at TOC was also assessed simultaneously by infection type and by SIRS status and Charlson comorbidity score (Table 6E). For subjects with AP, overall success rates trended towards being more favorable in the M-V group compared with the P-T group for subjects with SIRS. Overall success rates trended towards being more favorable for M-V in subjects with AP who had a higher Charlson comorbidity score (i.e., ≥3). For subjects with cUTI with a non-removable source of infection, overall success rates trended towards being more favorable in the M-V group compared with the P-T group for subjects with SIRS. Charlson comorbidity score did not affect overall success rates in subjects with cUTI with a non-removable source of infection.

In conclusion, at TOC, overall success rates in subjects with AP who had SIRS were higher than in those without SIRS for the meropenem-vaborbactam group. Outcomes in those with a Charlson comorbidity score of ≥3 were lower than in those with a score of ≤2 at the TOC time point. For subjects with AP, overall success rates trended towards being more favorable in the M-V group compared with the P-T group in subjects with SIRS and in subjects with a higher Charlson comorbidity score (i.e., ≥3). For subjects with cUTI with a non-removable source of infection, overall success rates trended towards being more favorable in the M-V group compared with the P-T group for subjects with SIRS. The results are summarized in Table 6F below.

TABLE 6C

SIRS Status by Infection Type at Baseline (m-MITT Population)

| Characteristics | M-V (N = 192) n/N¹ (%) | P-T (N = 182) n/N¹ (%) |
|---|---|---|
| Overall | | |
| SIRS Status | | |
| Yes | 55/192 (28.6) | 61/182 (33.5) |
| No | 137/192 (71.4) | 121/182 (66.5) |
| Acute Pyelonephritis | | |
| SIRS Status | | |
| Yes | 44/120 (36.7) | 47/101 (46.5) |
| No | 76/120 (63.3) | 54/101 (53.5) |
| cUTI with Removable Source of Infection | | |
| SIRS Status | | |
| Yes | 4/35 (11.4) | 5/38 (13.2) |
| No | 31/35 (88.6) | 33/38 (86.8) |
| cUTI with Non-Removable Source of Infection | | |
| SIRS Status | | |
| Yes | 7/37 (18.9) | 9/43 (20.9) |
| No | 30/37 (81.1) | 34/43 (79.1) |

Percentage is calculated using N¹, the number of subjects in the corresponding infection type, as the denominator.

TABLE 6D

Charlson Comorbidity Score by Infection Type at Baseline (m-MITT Population)

| Characteristic | M-V (N = 192) n/N¹ (%) | P-T (N = 183) n/N¹ (%) |
|---|---|---|
| Overall | | |
| Charlson Comorbidity Score | | |
| ≤2 | 89/192 (46.4) | 77/182 (42.3) |
| ≥3 | 103/192 (53.6) | 105/182 (57.7) |
| Acute Pyelonephritis | | |
| Charlson Comorbidity Score | | |
| ≤2 | 71/120 (59.2) | 60/101 (59.4) |
| ≥3 | 49/120 (40.8) | 41/101 (40.6) |
| cUTI with Removable Source of Infection | | |
| Charlson Comorbidity Score | | |
| ≤2 | 10/35 (28.6) | 6/38 (15.8) |
| ≥3 | 25/35 (71.4) | 32/38 (84.2) |
| cUTI with Non-Removable Source of Infection | | |
| Charlson Comorbidity Score | | |
| ≤2 | 8/37 (21.6) | 11/43 (25.6) |
| ≥3 | 29/37 (78.4) | 32/43 (74.4) |

Percentage is calculated using N¹, the number of subjects in the corresponding infection type, as the denominator.

TABLE 6E

| | M-V n/N (%) | P-T n/N (%) | Diff and 95% CI |
|---|---|---|---|
| Acute Pyelonephritis SIRS Status | 99/120 (82.5) | 76/101 (75.2) | 7.3 (−3.6, 18.1) |
| Yes | 41/44 (93.2) | 36/47 (76.6) | 16.6 (2.4, 30.8) |
| No | 58/76 (76.3) | 40/54 (74.1) | 22 (−12.9, 17.3) |
| Charlson Comorbidity Score | | | |
| ≤2 | 63/71 (88.7) | 52/60 (86.7) | 2.1 (−9.3, 13.4) |
| ≥3 | 36/49 (73.5) | 24/41 (58.5) | 14.9 (−4.6, 34.4) |
| cUTI with Removable Source of Infection SIRS Status | 21/35 (60.0) | 23/38 (60.5) | −0.5 (−23.0, 21.9) |
| Yes | 3/4 (75.0) | 3/5 (60.0) | 15.0 (−45.4, 75.4) |
| No | 18/31 (58.1) | 20/33 (60.6) | −2.5 (−26.6, 21.5) |
| Charlson Comorbidity Score | | | |
| ≤2 | 5/10 (50.0) | 5/6 (83.3) | −33.3 (−76.3, 9.7) |
| ≥3 | 16/25 (64.0) | 18/32 (56.3) | 7.8 (−17.7, 33.2) |
| cUTI with Non-Removable Source of Infection SIRS Status | 23/37 (62.2) | 29/43 (67.4) | −5.3 (−26.3, 15.7) |
| Yes | 7/7 (100.0) | 5/9 (55.6) | 44.4 (12.0, 76.9) |
| No | 16/30 (53.3) | 24/34 (70.6) | −17.3 (−40.8, 6.3) |
| Charlson Comorbidity Score | | | |
| ≤2 | 7/8 (87.5) | 9/11 (81.8) | 5.7 (−26.6, 38.0) |
| ≥3 | 16.29 (55.2) | 20/32 (62.5) | −7.3 (−32.0, 17.3) |

TABLE 6F

Overall Success Rates at EOIVT and TOC for the mMITT Population

| | EOIVT | | | TOC | | |
|---|---|---|---|---|---|---|
| | M-V | P-T | Difference (95% CI) | M-V | P-T | Difference (95% CI) |
| With SIRS | 54/55 (98.2) | 58/61 (95.1) | 3.1 (−5.3, 12.0) | 51/55 (92.7) | 44/61 (72.1) | 20.6 (7.0, 34.2) |
| Without SIRS | 135/137 (98.5) | 113/121 (93.4) | 5.2 (0.5, 11.2) | 92/137 (67.2) | 84/121 (69.4) | −2.3 (−13.5, 9.2) |
| Charlson Comorbidity Score ≤2 | 87/89 (97.8) | 75/77 (97.4) | 0.4 (−5.6, 7.0) | 75/89 (84.3) | 66/77 (85.7) | −1.4 (−12.5, 10.0) |
| Charlson Comorbidity Score ≥3 | 102/103 (99.0) | 96/105 (91.4) | 7.6 (2.2, 14.7) | 68/103 (66.0) | 62/105 (59.0) | 7.0 (−6.2, 19.9) |

Bacteremia Status

The study drug exposure for subjects with baseline bacteremia is summarized in Table 7 and the baseline characteristics of subjects with bacteremia in the m-MITT population are listed in Table 8 below. In the m-MITT group, the bacteremia status of M-V and P-T subjects at baseline was similar: the concurrent bacteremia is 6.3% ($^{12}/_{192}$) in M-V group and 8.2% ($^{15}/_{182}$) in P-T group. Most subjects with bacteremia had AP (92% [$^{11}/_{12}$] in the M-V group; 60% [$^{9}/_{15}$] in the P-T group). *Escherichia coli* was the most common baseline pathogen found in blood and urine cultures in subjects with bacteremia. Other baseline pathogens presented in subjects with concurrent bacteremia at baseline in the m-MITT population include *K. pneumoniae* and *P. mirabilis*.

TABLE 7

Study Drug Exposure in Subjects with Baseline Bacteremia (m-MITT Population)

| Category | M-V (N = 12) | P-T (N = 15) | Total (N = 27) |
|---|---|---|---|
| Patients Receiving only IV therapy | | | |
| N | 4 | 8 | 12 |
| Mean ± SD (days) | 7.8 (6.40) | 10.6 (3.02) | 9.7 (4.36) |
| Patients Receiving IV and Oral Step-Down Therapy | | | |
| N | 8 | 7 | 15 |
| Total (Mean ± SD (days)) | 10.5 (0.76) | 10.7 (1.11) | 10.6 (0.91) |
| IV (Mean ± SD (days)) | 6.9 (1.13) | 7.0 (1.41) | 6.9 (1.22) |
| PO (Mean ± SD (days)) | 4.4 (1.06) | 4.6 (1.13) | 4.5 (1.06) |

Exposure = last dose date of study drug − first dose date of study drug + 1, using calendar days.
Note:
IV dose may be taken in 11 calendar days.
M-V, meropenem-vaborbactam;
P-T, piperacillin-tazobactam.

TABLE 8

Baseline Characteristics of Subjects with Bacteremia (m-MITT Population)

| Characteristic | M-V (N = 12) n (%) | P-T (N = 15) n (%) | Total (N = 27) n (%) |
|---|---|---|---|
| AP | 11 (91.7) | 9 (60.0) | 20 (74.1) |
| cUTI | 1 (8.3) | 6 (40.0) | 7 (25.9) |
| With removable source of infection | 0 (0.0) | 3 (20.0) | 3 (11.1) |
| With non-removable source of infection | 1 (8.3) | 3 (20.0) | 4 (14.8) |

TABLE 8-continued

Baseline Characteristics of Subjects with Bacteremia (m-MITT Population)

| Characteristic | M-V (N = 12) n (%) | P-T (N = 15) n (%) | Total (N = 27) n (%) |
|---|---|---|---|
| Age (y): mean (SD) | 55.3 (20.7) | 58.7 (15.9) | 57.2 (17.9) |
| No. ≥65 y | 5 (41.7) | 5 (33.3) | 10 (37.0) |
| Gender, female | 10 (83.3) | 12 (80.0) | 22 (81.5) |
| Race, white | 9 (75.0) | 14 (93.3) | 23 (85.2) |
| Creatinine clearance (mL/min): mean (SD) | 68.1 (26.6) | 73.3 (24.8) | 71.0 (25.3) |
| No. with ≤50 mL/min | 4 (33.3) | 3 (20.0) | 7 (25.9) |
| Diabetes mellitus | 1 (8.3) | 6 (40.0) | 7 (25.9) |
| SIRS | 8 (66.7) | 7 (46.7) | 15 (55.6) |
| Charlson comorbidity score ≥3 | 9 (75.0) | 11 (73.3) | 20 (74.1) |

MIC values for baseline pathogens in subjects with bacteremia at baseline are summarized in Table 9.

TABLE 9

| Antimicrobial Agent Baseline Pathogen | MIC (µg/mL) of Antimicrobial Agent | |
|---|---|---|
| | Median* (µg/mL) | Range** |
| Meropenem-vaborbactam | | |
| *E. coli* (N = 9) | ≤0.06 | NA |
| *K. pneumoniae* (N = 2) | ≤0.06 | NA |
| Piperacillin-tazobactam | | |
| *E. coli* (N = 13) | 2 | 1-32 |
| *K. pneumoniae* (N = 1) | 2 | NA |
| *P. mirabilis* (N = 1) | ≤0.05 | NA |

Note:
Only data from blood cultures are included.
N refers to the number of isolates recovered in subjects with baseline bacteremia treated with the specified antimicrobial agent.
*Where the number of isolates equals 1 (N = 1), the individual MIC value is provided. Where N = 2, the median MIC value is provided.
**Range is provided for baseline pathogens with ≥2 isolates.

It was observed that in bacteremic subjects, the overall success rates at EOIVT were lower in the M-V group than in the P-T group (83.3% vs 100%). At EOIVT, the 2 subjects with bacteremia in the M-V group who did not achieve overall success were classified as failures because study drug was prematurely discontinued due to an AE (tremor in one; infusion-related reaction in the other). In both cases, the bloodstream was cleared of bacteria. At EOIVT, the bloodstream was cleared of bacteria in all subjects with bacteremia. Overall success rates at TOC were higher in the M-V group compared with the P-T group (75% vs 60%). Lower overall success rates at the TOC time point vs the EOIVT time point were driven by recurrence of baseline organisms in the urine. These findings suggest that meropenem-vaborbactam is able to effectively treat subjects with concurrent bacteremia associated with cUTI or AP, which occurred in 7% of study subjects with a baseline urinary pathogen. The results are summarized in Table 10 below.

TABLE 10

Overall Success by Time point (m-MITT population)

| | EOIVT | | TOC | |
| --- | --- | --- | --- | --- |
| | M-V (N = 192) | P-T (N = 182) | M-V (N = 192) | P-T (N = 182) |
| Presence of Bacteremia | 10/12, 83.3% | 15/15, 100% | 9/12, 75.0% | 9/15, 60.0% |
| Absence of Bacteremia | 174/175, 99.4% | 153/164, 93.3% | 131/175, 74.9% | 118/164, 72.0% |

Conclusion: Phase 3 study assessing the efficacy, safety and tolerability of meropenem-vaborbactam compared with piperacillin-tazobactam in the treatment of adults with cUTI, including AP. This study demonstrates that meropenem-vaborbactam is noninferior to piperacillin/tazobactam in the treatment of cUTI, including AP. The results met FDA pre-specified non-inferiority margin and also met criteria for superiority for efficacy. In addition, the results met EMA pre-specified non-inferiority margin as specified in EMA Guidance. Consistent efficacy results observed across clinical and microbiology endpoints and analysis populations. The safety and tolerability of meropenem-vaborbactam was comparable to piperacillin/tazobactam. In addition, the type and incidence of treatment emergent adverse events in meropenem-vaborbactam group similar to those previously reported with meropenem.

Example 2

Example 2 provides a summary of a clinical study of Phase III, multicenter, randomized, open-label study of meropenem-vaborbactam versus best available therapy (BAT) in subjects with selected serious infections due to carbapenem-resistant enterobacteriaceae (CRE), including cUTI/AP, complicated intra-abdominal infection (cIAI), hospital-acquired bacterial pneumonia (HABP), ventilator-acquired bacterial pneumonia (VABP), and bacteremia, suspected or known to be caused by CRE.

Subjects with either a known or suspected CRE infection who were expected to need at least 7 days of treatment with intravenous (IV) antibiotics were enrolled in a 2:1 ratio to one of the following groups: meropenem 2 g-vaborbactam 2 g IV q8h, with each dose infused for 3 hours for up to 14 days; BAT with the following IV antibiotics either alone or in combination for up to 14 days: carbapenem (meropenem, ertapenem, or imipenem), tigecycline, colistin, aminoglycosides (amikacin, tobramycin, or gentamicin), polymyxin B, or ceftazidime-avibactam alone.

Randomization was stratified by presenting indication (cUTI or AP, cIAI, HABP, VABP, and bacteremia) and by region (North America, Europe, Asia Pacific, rest of the world).

The study consisted of the following periods: A screening and randomization period of 1 day; A treatment period of 7 days to 14 days with Day 1 the first day of study drug administration and End of Treatment (EOT) the final day of study drug administration (+1 day); A follow-up period of 5 days to 16 days, including a Test of Cure (TOC) visit 7 (±2) days following EOT and Late Follow-Up visit (LFU) 14 (±2) days following EOT. Thus, the total duration of study participation was approximately 29 days with a maximum duration of 31 days.

Study Endpoints

Safety parameters included adverse events (AEs), clinical laboratory parameters (hematology, chemistry, and urinalysis), vital signs (blood pressure, heart rate, and respiratory rate), electrocardiograms (ECGs), and AEs of special interest based on AEs noted in the warnings and precautions section of the meropenem labels, including hypersensitivity, seizure, and *Clostridium difficile*-associated diarrhea (CDAD).

To assess any potential changes in renal function, changes in serum creatinine were analyzed using the first three classes of Risk, Injury, Failure, Loss, or End-Stage (RIFLE) criteria. Class 1: Risk—increase in serum creatinine≥1.5 times Baseline value. Class 2: Injury—increase in serum creatinine≥2 times Baseline value. Class 3: Failure—increase in serum creatinine≥3 times Baseline value or an acute increase in serum creatinine≥44 µmol/L from Baseline≥354 µmol/L. class 4 (complete loss of kidney function for over 4 weeks) and class 5 (end stage; complete loss kidney function for over 3 months) were not applicable in this study because the study duration was approximately 4 weeks.

Efficacy endpoints include the following:
Proportion of subjects with a clinical outcome of Cure at EOT and TOC, based on an assessment of the signs and symptoms of infection by the investigator, across all indications; in cUTI/AP subjects only; and in bacteremic subjects only;
Proportion of subjects with a microbiologic outcome of Eradication at EOT and TOC by both the Food and Drug Administration's (FDA) and European Medicines Agency's (EMA) colony forming units (CFU)/mL criteria (<10⁴ CFU/mL of urine and <10³ CFU/mL of urine, respectively); cUTI/AP subjects only and bacteremic subjects only;
Proportion of subjects with overall success, a composite endpoint of clinical Cure and microbiologic Eradication, at EOT and TOC; cUTI/AP subjects only and bacteremic subjects only;
All-cause mortality rate at Day 28. For this endpoint, mortality data for HABP/VABP subjects were combined with data for subjects with bacteremia.

Efficacy data were analyzed for two populations, a Microbiological Carbapenem-resistant Enterobacteriaceae Modified Intent-to-Treat (mCRE-MITT) Population and Microbiological Modified Intent-to-Treat (m-MITT) Population. mCRE-MITT population includes all subjects who received at least one dose of study drug and who had Enterobacteriaceae at baseline that was confirmed as meropenem-resistant. m-MITT population includes all subjects who received at least one dose of study drug and had a gram-negative bacterial pathogen(s) at baseline. The mCRE-MITT Population was the primary population for efficacy.

Study Subjects

A total of 41 subjects were randomized: 25 to meropenem-vaborbactam group and 16 to BAT group. Of the 41 subjects randomized, 39 received at least one dose of study drug (MITT Population): 23 in the meropenem-vaborbactam group and 16 in the BAT group. The 39 subjects in the meropenem-vaborbactam and BAT groups in the MITT Population included 23 subjects with cUTI or AP (15 and 8 subjects, respectively), 12 subjects with bacteremia (7 and 5 subjects, respectively), 5 subjects with HABP/VABP (3 and 2 subjects, respectively), and 1 subject with cIAI (BAT). The majority of subjects in the meropenem-vaborbactam (65.2%) and BAT (68.8%) groups completed the study treatment.

Safety Summary

At the interim analysis, the AE profile of meropenem-vaborbactam and BAT are similar. The proportion of subjects with an AE was similar in the meropenem-vaborbactam and BAT groups (87.0% and 87.5%, respectively). The most frequent AEs in both groups were diarrhea and sepsis/septic shock. Diarrhea was reported in a similar proportion of subjects in the meropenem-vaborbactam (13.0%) and BAT groups (18.8%). Sepsis/septic shock was reported in a lower proportion of subjects in the meropenem-vaborbactam group (8.7%) compared with the BAT group (31.3%). No subjects in the meropenem-vaborbactam group, but 2 subjects (12.5%) in the BAT group had an acute kidney injury as defined by RIFLE criteria.

Efficacy Summary

Cure rates in the overall population were higher in the meropenem-vaborbactam group compared to the BAT group at EOT and similar in both groups at TOC (see Table 11). All-cause mortality rates at Day 28 in the overall population were similar in both groups.

Cure rates at EOT across all infections were 60.0% in the meropenem-vaborbactam group and 30.0% in the BAT group in the mCRE-MITT Population and 64.7% in the meropenem-vaborbactam group and 38.5% in the BAT group in the m-MITT Population. Cure rates at TOC across all infections were 40.0% in both groups in the mCRE-MITT Population and 41.2% in the meropenem-vaborbactam group and 46.2% in the BAT group in the m-MITT Population.

All-cause mortality rates at Day 28 across all infections were 26.7% in the meropenem-vaborbactam group and 30.0% in the BAT group in the mCRE-MITT Population and 23.5% in the meropenem-vaborbactam group and 23.1% in BAT group in the m-MITT Population.

TABLE 11

Cure Rates and 28-Day All-Cause Mortality Rates across All Infections

| Endpoint | m-MITT Population | | mCRE-MITT Population | |
|---|---|---|---|---|
| | Meropenem-Vaborbactam (N = 17) n (%) | BAT[1] (N = 13) n (%) | Meropenem-Vaborbactam (N = 15) n (%) | BAT[1] (N = 10) n (%) |
| Cure at EOT | 11 (64.7) | 5 (38.5) | 9 (60.0) | 3 (30.0) |
| Cure at TOC | 7 (41.2) | 6 (46.2) | 6 (40.0) | 4 (40.0) |
| All-cause mortality at Day 28 | 4 (23.5) | 3 (23.1) | 4 (26.7) | 3 (30.0) |

[1]Sixty percent of subjects in the BAT group were treated with a regimen that included a carbapenem and 50.0% were treated with a regimen that included colistin or polymyxin B or an aminoglycoside.

In summary, clinical cure rates in the overall subject population across all indications were higher in the meropenem-vaborbactam group compared to the BAT group at EOT and were similar at TOC. For subjects with cUTI/AP, the rates of Cure, Eradication, and overall success at EOT were similar in the meropenem-vaborbactam and BAT groups.

What is claimed is:

1. A method of treating or ameliorating complicated urinary tract infection (cUTI) or acute pyelonephritis (AP) in a subject in need thereof, comprising administering a combination of an amount of vaborbactam or a pharmaceutically acceptable salt thereof and an amount of meropenem to the subject, wherein the subject has a Charlson comorbidity score equal to or greater than 3.

2. The method of claim 1, wherein the subject is suffering from cUTI.

3. The method of claim 1, wherein the subject is suffering from AP.

4. The method of claim 1, wherein the subject is also suffering from concomitant bacteremia.

5. The method of claim 1, wherein the administration continues for at least five days.

6. The method of claim 1, wherein the subject is a female.

7. The method of claim 1, wherein the subject has a creatinine clearance rate of equal to or greater than 40 mL/min.

8. The method of claim 1, wherein the subject has a creatinine clearance rate of equal to or greater than 30 mL/min.

9. The method of claim 1, wherein the subject has a systemic inflammatory response syndrome (SIRS).

10. A method of treating or ameliorating complicated urinary tract infection (cUTI) or acute pyelonephritis (AP) in a subject in need thereof, comprising:
    selecting for treatment a subject having a systemic inflammatory response syndrome (SIRS) who is also suffering from cUTI or AP; and
    administering a combination of an amount of vaborbactam or a pharmaceutically acceptable salt thereof and an amount of meropenem to the subject, wherein the subject has a Charlson comorbidity score equal to or greater than 3.

11. The method of claim 10, wherein the subject has one or more of the following characteristics at the time of treatment: body temperature less than 36° C. or more than 38° C., heart rate more than 90 bpm, respiratory rate greater than 20 breaths/min, an arterial partial pressure of carbon dioxide less than 4.3 kPa (32 mmHg), white blood cell count more than 12,000 cells/mm$^3$ or less than 4,000 cells/mm$^3$, or the presence of greater than 10% immature neutrophils.

12. A method of treating or ameliorating complicated urinary tract infection (cUTI) or acute pyelonephritis (AP) in a subject in need thereof, comprising:
  selecting for treatment a subject having a Charlson comorbidity score of equal to or greater than 3, who is also suffering from cUTI or AP; and
  administering a combination of an amount of vaborbactam or a pharmaceutically acceptable salt thereof and an amount of meropenem to the subject.

13. The method of claim 12, wherein the subject is also suffering from concomitant bacteremia.

14. The method of claim 12, wherein the administration continues for at least five days.

15. The method of claim 12, wherein the subject has a creatinine clearance rate of equal to or greater than 40 mL/min.

16. The method of claim 12, wherein the subject has a creatinine clearance rate of equal to or greater than 30 mL/min.

17. The method of claim 1, wherein the cUTI or AP is caused by a baseline pathogen selected from the group consisting of E. coli, K. pneumoniae, Enterococcus faecalis, Proteus mirabilis, Enterobacter cloacae species complex, and P. aeruginosa, or combinations thereof.

18. A method of treating or ameliorating a serious infection due to carbapenem-resistant enterobacteriaceae (CRE) in a subject in need thereof, comprising:
  selecting for treatment a subject having a CRE infection that requires at least 7 days of treatment with intravenous antibiotics; and
  administering a combination of an amount of vaborbactam or a pharmaceutically acceptable salt thereof and an amount of meropenem to the subject.

19. The method of claim 18, wherein the CRE infection is selected from the group consisting of cUTI, AP, cIAI, HABP, VABP, and bacteremia, and combinations thereof.

20. The method of claim 18, wherein the method provides less adverse events in the treatment of the CRE infection as compared to a subject treated with best available therapy.

21. The method of claim 18, wherein the method provides a higher success rate in the treatment of the CRE infection as compared to a subject treated with best available therapy.

22. The method of claim 21, wherein the best available therapy is selected from the group consisting of ciprofloxacin, polymyxin B, colistin, amikacin, meropenem, gentamicin, ertapenem, tigecycline, and ceftazidime-avibactam, and combinations thereof.

23. The method of claim 18, wherein the subject has a Charlson comorbidity score of equal to or greater than 3.

24. The method of claim 23, wherein the subject has a Charlson comorbidity score of equal to or greater than 5.

25. The method of claim 18, wherein the subject has a systemic inflammatory response syndrome (SIRS).

26. The method of claim 18, wherein the amount of vaborbactam or the pharmaceutically acceptable salt thereof is about 2 g.

27. The method of claim 18, wherein the amount of meropenem is about 2 g.

28. The method of claim 18, wherein the combination is administered at least once per day.

29. The method of claim 28, wherein the combination is administered every 8 hours.

30. The method of claim 18, wherein the administration is by intravenous infusion.

31. The method of claim 30, wherein the intravenous infusion is completed is about 3 hours.

32. The method of claim 18, wherein vaborbactam or the pharmaceutically acceptable salt thereof is administered prior or subsequent to meropenem.

33. The method of claim 18, wherein vaborbactam or the pharmaceutically acceptable salt thereof and meropenem are in a single dosage form.

34. The method of claim 18, further comprises administering one or more additional medicaments selected from the group consisting of an antibacterial agent, antifungal agent, an antiviral agent, an anti-inflammatory agent, and an anti-allergic agent, and combinations thereof.

35. The method of claim 10, wherein the subject is also suffering from concomitant bacteremia.

36. The method of claim 10, wherein the administration continues for at least five days.

37. The method of claim 10, wherein the subject has a creatinine clearance rate of equal to or greater than 40 mL/min.

38. The method of claim 10, wherein the subject has a creatinine clearance rate of equal to or greater than 30 mL/min.

39. The method of claim 10, wherein the cUTI or AP is caused by a baseline pathogen selected from the group consisting of E. coli, K. pneumoniae, Enterococcus faecalis, Proteus mirabilis, Enterobacter cloacae species complex, and P. aeruginosa, or combinations thereof.

40. The method of claim 12, wherein the cUTI or AP is caused by a baseline pathogen selected from the group consisting of E. coli, K. pneumoniae, Enterococcus faecalis, Proteus mirabilis, Enterobacter cloacae species complex, and P. aeruginosa, or combinations thereof.

41. The method of claim 21, wherein the best available therapy is selected from the group consisting of ciprofloxacin, polymyxin B, colistin, amikacin, meropenem, gentamicin, ertapenem, tigecycline, and ceftazidime-avibactam, and combinations thereof.

42. The method of claim 1, wherein the amount of vaborbactam or the pharmaceutically acceptable salt thereof is about 2 g.

43. The method of claim 1, wherein the amount of meropenem is about 2 g.

44. The method of claim 1, wherein the combination is administered at least once per day.

45. The method of claim 44, wherein the combination is administered every 8 hours.

46. The method of claim 1, wherein the administration is by intravenous infusion.

47. The method of claim 46, wherein the intravenous infusion is completed in about 3 hours.

48. The method of claim 1, wherein vaborbactam or the pharmaceutically acceptable salt thereof is administered prior or subsequent to meropenem.

49. The method of claim 1, wherein vaborbactam or the pharmaceutically acceptable salt thereof and meropenem are in a single dosage form.

50. The method of claim 1, further comprises administering one or more additional medicaments selected from the group consisting of an antibacterial agent, antifungal agent, an antiviral agent, an anti-inflammatory agent, and an anti-allergic agent, and combinations thereof.

51. The method of claim 10, wherein the amount of vaborbactam or the pharmaceutically acceptable salt thereof is about 2 g.

52. The method of claim 10, wherein the amount of meropenem is about 2 g.

53. The method of claim 10, wherein the combination is administered at least once per day.

54. The method of claim 53, wherein the combination is administered every 8 hours.

55. The method of claim 10, wherein the administration is by intravenous infusion.

56. The method of claim 55, wherein the intravenous infusion is completed in about 3 hours.

57. The method of claim 10, wherein vaborbactam or the pharmaceutically acceptable salt thereof is administered prior or subsequent to meropenem.

58. The method of claim 10, wherein vaborbactam or the pharmaceutically acceptable salt thereof and meropenem are in a single dosage form.

59. The method of claim 10, further comprises administering one or more additional medicaments selected from the group consisting of an antibacterial agent, antifungal agent, an antiviral agent, an anti-inflammatory agent, and an anti-allergic agent, and combinations thereof.

60. The method of claim 12, wherein the amount of vaborbactam or the pharmaceutically acceptable salt thereof is about 2 g.

61. The method of claim 12, wherein the amount of meropenem is about 2 g.

62. The method of claim 12, wherein the combination is administered at least once per day.

63. The method of claim 62, wherein the combination is administered every 8 hours.

64. The method of claim 12, wherein the administration is by intravenous infusion.

65. The method of claim 64, wherein the intravenous infusion is completed in about 3 hours.

66. The method of claim 12, wherein vaborbactam or the pharmaceutically acceptable salt thereof is administered prior or subsequent to meropenem.

67. The method of claim 12, wherein vaborbactam or the pharmaceutically acceptable salt thereof and meropenem are in a single dosage form.

68. The method of claim 12, further comprises administering one or more additional medicaments selected from the group consisting of an antibacterial agent, antifungal agent, an antiviral agent, an anti-inflammatory agent, and an anti-allergic agent, and combinations thereof.

69. The method of claim 1, wherein the subject is a human suffering from moderate or severe liver disease.

* * * * *